US010503702B2

United States Patent
Miki

(10) Patent No.: US 10,503,702 B2
(45) Date of Patent: Dec. 10, 2019

(54) INFORMATION PROCESSING DEVICE, INFORMATION PROCESSING METHOD, AND PROGRAM

(71) Applicant: Fixstars Corporation, Tokyo (JP)

(72) Inventor: Satoshi Miki, Tokyo (JP)

(73) Assignee: Fixstars Corporatioon, Tokyo (JP)

( * ) Notice: Subject to any disclaimer, the term of this patent is extended or adjusted under 35 U.S.C. 154(b) by 1133 days.

(21) Appl. No.: 14/765,366

(22) PCT Filed: Oct. 23, 2013

(86) PCT No.: PCT/JP2013/078734
§ 371 (c)(1),
(2) Date: Nov. 24, 2015

(87) PCT Pub. No.: WO2014/119063
PCT Pub. Date: Aug. 7, 2014

(65) Prior Publication Data
US 2016/0085771 A1  Mar. 24, 2016

(30) Foreign Application Priority Data

Feb. 4, 2013 (JP) .................................. 2013-019170

(51) Int. Cl.
*G06F 16/18* (2019.01)
*G06F 16/13* (2019.01)
(Continued)

(52) U.S. Cl.
CPC ........ *G06F 16/1847* (2019.01); *G06F 3/0619* (2013.01); *G06F 3/0643* (2013.01);
(Continued)

(58) Field of Classification Search
CPC ............... G06F 17/30; G06F 17/30091; G06F 17/30218; G06F 17/30339; G06F 16/116;
(Continued)

(56) References Cited

U.S. PATENT DOCUMENTS 5,675,725 A * 10/1997 Malcolm .................. G06F 9/52
714/6.12
2002/0004845 A1* 1/2002 Yamamoto ............ G06F 3/0601
709/240
(Continued)

FOREIGN PATENT DOCUMENTS

JP  2004362464 A  12/2004

OTHER PUBLICATIONS

Translation of Japanese Application # JP2004362464 (Computer system using nonvolatile memory) Ozaki (Dec. 24, 2004) (Year: 2004).*

(Continued)

*Primary Examiner* — James Trujillo
*Assistant Examiner* — Fariborz Khoshnoodi
(74) *Attorney, Agent, or Firm* — MKG, LLC

(57) ABSTRACT

There is provided an information processing device comprising an NV memory that is a non-volatile recording medium, a file system unit that manages one or more files stored in the NV memory, and a memory management unit that secures one or more areas of the NV memory that are ready to be used by the file system unit to store a file, and allocates the secured one or more areas to a running process in response to a request from the running process. According to the information processing device, when the NV memory is used both as a main memory and a storage, inconsistencies in the file system caused by an abnormal termination of the system are reduced.

5 Claims, 11 Drawing Sheets

(51) Int. Cl.
*G06F 12/02* (2006.01)
*G06F 3/06* (2006.01)

(52) U.S. Cl.
CPC ........ *G06F 3/0679* (2013.01); *G06F 12/0238* (2013.01); *G06F 16/13* (2019.01)

(58) Field of Classification Search
CPC ............... G06F 16/172; G06F 16/1727; G06F 16/1847; G06F 16/13
USPC ......................................... 707/824, 822, 823
See application file for complete search history.

(56) References Cited

U.S. PATENT DOCUMENTS

| | | | | |
|---|---|---|---|---|
| 2007/0030734 | A1* | 2/2007 | Sinclair | G06F 3/0605 365/185.11 |
| 2010/0332534 | A1* | 12/2010 | Chang | G06F 16/1847 707/770 |
| 2015/0058562 | A1* | 2/2015 | Vaghani | G06F 9/5022 711/114 |

OTHER PUBLICATIONS

Translation of Japanese Application # JP2004362464 (Computer system using nonvolatile memory) Ozaki (Dec. 24, 2004) (Year: 2004). (Year: 2004).*

Oikawa (Unfication of Non-Volatile Main memory and a File System) IPSJ Journal [CD-ROM], Mar. 15, 2013 (Mar. 15, 2013), vol. 54, No. 3, pp. 1153 to 1164 (Year: 2013).*

Office Action issued in corresponding Japanese Application No. 2013-019170, dated May 13, 2014, pp. 1-3.

PCT Written Opinion of the International Search Authority issued in PCT/JP2013/078734, dated Dec. 10, 2013, pp. 1-4.

PCT International Search Report issued in PCT/JP2013/078734, dated Dec. 10, 2013, pp. 1-3.

"What is SSD?", IT Glossary e-Words, Searched on Jan. 23, 2013, Internet, [URL:http://e-words.jp/w/SSD.html] (retrieved on May 26, 2016).

"What is EEPROM?", IT Glossary e-Words, Searched on Jan. 23, 2013, Internet, [URL:http://e-words.jp/w/EEPROM.html] (retrieved on May 26, 2016).

Bailey, Katelin et al., "Operation System Implications of Fast, Cheap, Non-Volatile Memory", HotOS '13 Proceedings of the 13th USENIX conference on Hot topics in operating systems, USENIX Association Berkeley, May 9, 2011, [retrieved on Nov. 26, 2014] <URL:http://homes.cs.washington.edu/~gribble/papers/hotos-OS-NVRAM.pdf>.

Bailey, Katelin et al., "Operation System Implications of Fast, Cheap, Non-Volatile Memory" (Presentation Slides), HotOS '13 Proceedings of the 13th USENIX conference on Hot topics in operating systems, USENIX Association Berkeley, May 9, 2011, [retrieved on Nov. 26, 2013] <URL:http://www.usenix.org/legacy/events/hotosll/tech/slides/bailey.pdf>.

Jung, Ju-Young et al., "Dynamic Co-Management of Persistent RAM Main Memory and Storage Resources", CF '11 proceedings of the 8th ACM International Conference on Computing Frontiers, ACM New York, May 3, 2011, [retrieved on Nov. 26, 2013] Retrieved from: The ACM Digital Library.

* cited by examiner

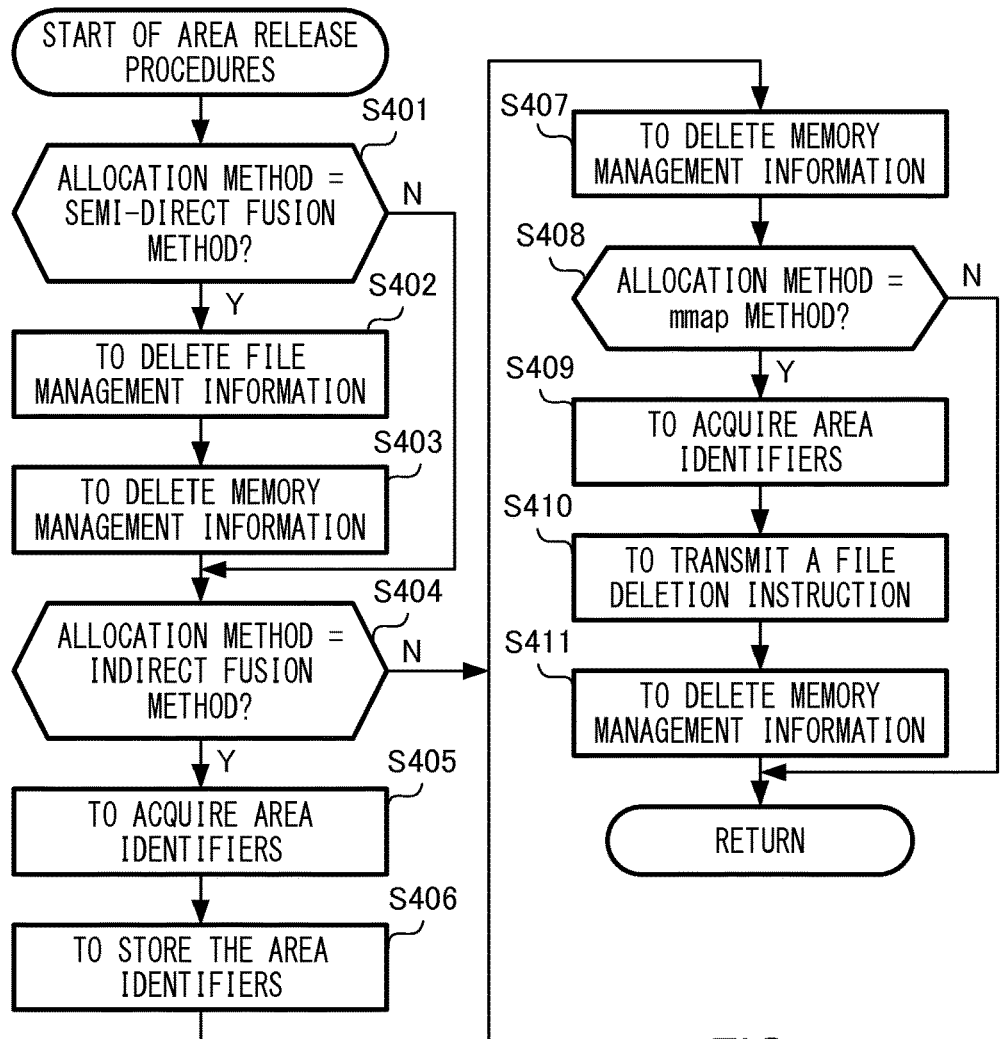

| ID | FILE | PHYSICAL ADDRESS |
|---|---|---|
| 001 | file01 | 0×00000001 |
| 002 | file01 | 0×00000002 |
| 003 | file01 | 0×00000003 |
| 004 | file03 | 0×00000011 |
| 005 | file03 | 0×00000012 |
| 006 | file03 | 0×00000013 |
| 007 | file03 | 0×00000014 |
| 008 | file01 | 0×00000004 |
| 009 | file01 | 0×00000005 |
| 010 | file01 | 0×00000006 |

FIG. 6

| ID | PROCESS | VIRTUAL ADDRESS | PHYSICAL ADDRESS |
|---|---|---|---|
| 001 | proc01 | 0×F0000001 | 0×00000004 |
| 002 | proc01 | 0×F0000002 | 0×00000005 |
| 003 | proc01 | 0×F0000003 | 0×00000006 |

FIG. 7

| ID | PROCESS | VIRTUAL ADDRESS | PHYSICAL ADDRESS |
|---|---|---|---|
| 001 | proc01 | 0×F0000001 | 0×00000011 |
| 002 | proc01 | 0×F0000002 | 0×00000012 |
| 003 | proc01 | 0×F0000003 | 0×00000013 |

FIG. 8

| ID | FILE | PHYSICAL ADDRESS |
|---|---|---|
| 001 | file01 | 0×00000001 |
| 002 | file01 | 0×00000002 |
| 003 | file01 | 0×00000003 |
| 004 | file03 | 0×00000011 |
| 005 | file03 | 0×00000012 |
| 006 | file03 | 0×00000013 |
| 007 | file03 | 0×00000014 |
| 008 | file99 | 0×00000004 |
| 009 | file99 | 0×00000005 |
| 010 | file99 | 0×00000006 |

```
static long nvmm_ioctl(struct file *file, unsigned int cmd, unsigned long arg);
```

```
struct file *f = fget(arg);
f->f_mapping->a_ops->get_xip_mem(f->f_mapping, offset, 1, &kmem, &pfn);
```

```
mallopt(M_MMAP_THRESHOLD, 0);
```

```
% qemu -m 128 -nvmemory file=nvmemory.img,physaddr=0x10000000
```

FIG. 15

| ALLOCATION METHOD | NUMBER OF REPORTED INCONSISTENCY |
|---|---|
| DIRECT FUSION METHOD | 6<br>(FREE BLOCK COUNT,<br>FREE BLOCK COUNT FOR GROUP #0~4) |
| SEMI-DIRECT FUSION METHOD | 0 |
| INDIRECT FUSION METHOD<br>(PREACLLOC) | 0 |
| INDIRECT FUSION METHOD<br>(ONDEMAND) | 0 |
| mmap METHOD | 0 |

FIG. 16

| ALLOCATION METHOD | QEMU | Atom D2700 | | |
|---|---|---|---|---|
| | TSC | TSC | Instruction Retired | LLC Misses |
| mmap (PRAMFS) | 283,077,871 | 1,323,548,403 | 279,735,226 | 244,193 |
| mmap (PRAMFS2) | 174,381,505 | 542,393,113 | 174,759,261 | 158,849 |
| INDIRECT FUSION (SECURE IN-ADVANCE) | 194,853,076 | 1,011,510,282 | 195,495,299 | 376,673 |
| DRAM | 232,532,655 | 1,084,599,768 | 231,098,787 | 316,281 |
| ALLOCATION METHOD | Atom D2700 | |
|---|---|---|
| | MEM LOAD RETIRED. L2 HIT | MEM LOAD RETIRED. L2 MISS |
| mmap (PRAMFS) | 843,429 | 29,668 |
| mmap (PRAMFS2) | 842,063 | 8,843 |
| INDIRECT FUSION (SECURE IN-ADVANCE) | 191,909 | 59,815 |
| DRAM | 84,207 | 41,583 |

FIG. 18

INFORMATION PROCESSING DEVICE, INFORMATION PROCESSING METHOD, AND PROGRAM

TECHNICAL FIELD

This invention relates to an information processing device using a non-volatile memory.

BACKGROUND ART

There are several types of non-volatile memory (non-volatile memory is referred to as NV memory hereinafter) such as SSD (see non-patent document 1) and EEPROM (see non-patent document 2). [[Non-patent Document 1: "What is SSD?" [online], IT Glossary e-Words, Searched on Jan. 23, 2013, Internet, [URL: http://e-words.jp/w/SSD.html]. Non-patent Document 2: "What is EEPROM?" [online], IT Glossary e-Words, Searched on Jan. 23, 2013, Internet, [URL: http://e-words.jp/w/EPROM.html].

As a result of several studies conducted in recent years for utilizing an NV memory as a main memory and utilizing a main memory as a storage, use of an NV memory as both a main memory and a storage without the area of the NV memory being divided into an area used as a main memory and an area used as a storage has been realized. When an NV memory is used as both a main memory and a storage, a main memory and a storage may be integrated, i.e. they can be treated as a memory without being distinguished from each other. If a main memory and a storage are integrated, efficiency of memory management in a system may be improved. However, when memory blocks managed by a file system are directly used as a part of a main memory, some problems of implementation and management may be caused. For example, according to known methods for using an NV memory as both a main memory and a storage, when a system is abnormally terminated, a file system may fail to manage files correctly.

SUMMARY

A first embodiment of the present invention is an information processing device comprising an NV memory that is a non-volatile recording medium, a file system unit that manages one or more files stored in the NV memory, and a memory management unit that secures one or more areas of the NV memory that are ready to be used by the file system unit to store a file, and allocates the secured one or more areas to a running process in response to a request from the running process.

According to the above-mentioned information processing device, when an NV memory is used both as a main memory and a storage, inconsistencies in a file system caused by an abnormal termination of a system may be reduced.

A second embodiment of the present invention is the information processing device according to the first embodiment, wherein the file system unit includes a file management information storing unit that stores one or more file management data sets each of which is used for managing a file and contains a file identifier identifying the file and one or more area identifiers each of which identifies an area of the NV memory for storing the file, and the memory management unit includes an unused area specifying unit that specifies one or more unused areas of the NV memory by use of the one or more file management data sets to secure one or more areas of the NV memory to be allocated to the running process, and acquires one or more area identifiers identifying the specified one or more unused areas in response to the request from the running process, and a file management information adding unit that generates one or more file management data sets indicating the one or more area identifiers acquired by the unused area specifying unit and a file identifier selected from among file identifiers contained in the one or more file management data sets stored in the file management information storing unit, and adds the generated one or more file management data sets to the one or more file management data sets stored in the file management information storing unit.

According to the above-mentioned information processing device, when an NV memory is used both as a main memory and a storage, inconsistencies in a file system caused by an abnormal termination of a system may be reduced.

A third embodiment of the present invention is the information processing device according to the first embodiment, wherein the file system unit includes a file management information storing unit that stores one or more file management data sets each of which is used for managing a file and contains a file identifier identifying the file and one or more area identifiers each of which identifies an area of the NV memory for storing the file, and the memory management unit includes an area identifier storing unit that stores one or more area identifiers, an area identifier acquisition unit that acquires one or more area identifiers from the file management information storing unit, and causes the area identifier storing unit to store the acquired one or more area identifiers, and an allocation unit that allocates one or more areas of the NV memory identified by one or more area identifiers selected from the one or more area identifiers stored in the area identifier storing unit to the running process in response to the request from the running process.

According to the above-mentioned information processing device, when an NV memory is used both as a main memory and a storage, inconsistencies in a file system caused by an abnormal termination of a system may be reduced.

A fourth embodiment of the present invention is the information processing device according to the third embodiment, wherein the area identifier acquisition unit acquires all of the area identifiers stored in the file management information storing unit at a timing determined by a predetermined rule, and causes the area identifier storing unit to store the acquired area identifiers.

According to the above-mentioned information processing device, when an NV memory is used both as a main memory and a storage, inconsistencies in a file system caused by an abnormal termination of a system may be reduced.

A fifth embodiment of the present invention is the information processing device according to the third embodiment, wherein the area identifier acquisition unit judges whether or not any area identifier is stored in the area identifier storing unit, and if no area identifier is stored in the area identifier storing unit, acquires one or more area identifiers from the file management information storing unit and causes the area identifier storing unit to store the acquired one or more area identifiers, in response to the request from the running process.

According to the above-mentioned information processing device, when an NV memory is used both as a main memory and a storage, inconsistencies in a file system caused by an abnormal termination of a system may be reduced.

A sixth embodiment of the present invention is the information processing device according to the first embodiment, wherein the file system unit writes a file of a size meeting with a size requested by the running process to the NV memory in response to the request from the running process, and the memory management unit allocates areas of the NV memory where the file is written by the file system unit to the running process in response to the request from the running program.

According to the above-mentioned information processing device, when an NV memory is used both as a main memory and a storage, inconsistencies in a file system caused by an abnormal termination of a system may be reduced.

According to the present invention, when an NV memory is used as both a main memory and a storage, a possibility of failure of a file system caused by an abnormal termination of a system is reduced.

BRIEF EXPLANATION OF THE DRAWINGS

FIG. 4 is a flow chart showing processes for releasing an area from a process in embodiment 1.

FIG. 5 illustrates examples of file management data sets in embodiment 1.

FIG. 6 illustrates examples of file management data sets in embodiment 1.

FIG. 7 illustrates examples of memory management data sets in embodiment 1.

FIG. 8 illustrates examples of memory management data sets in embodiment 1.

FIG. 15 illustrates an example of a command for starting QEMU in embodiment 1.

FIG. 16 illustrates an example of a failure report in embodiment 1.

FIG. 18 illustrates results of measurements of number of run commands and number of cache misses.

DETAILED DESCRIPTION

An information processing device according to an exemplary embodiment of the present invention will be explained below referring to figures. In the embodiment explained below, components having the same reference number perform similarly, and the performance of the components may not be explained repeatedly. Formats of data, contents of data, etc. used in the following explanation of the exemplary embodiment are examples, and any other formats, contents, etc., may be used for the present invention.

(Embodiment 1)

In this exemplary embodiment, information processing device 1 is explained. Information processing device 1 uses an NV memory as both a main memory and a storage without dividing an area of the NV memory into an area used as a main memory and an area used as a storage, and manages an area used as a main memory by use of a file system. In this application, a storage is a so-called secondary storage device or an auxiliary storage device, and a main memory is a so-called primary storage device or main storage device. An area used as a main memory means an area used by an active process.

Figure 1:
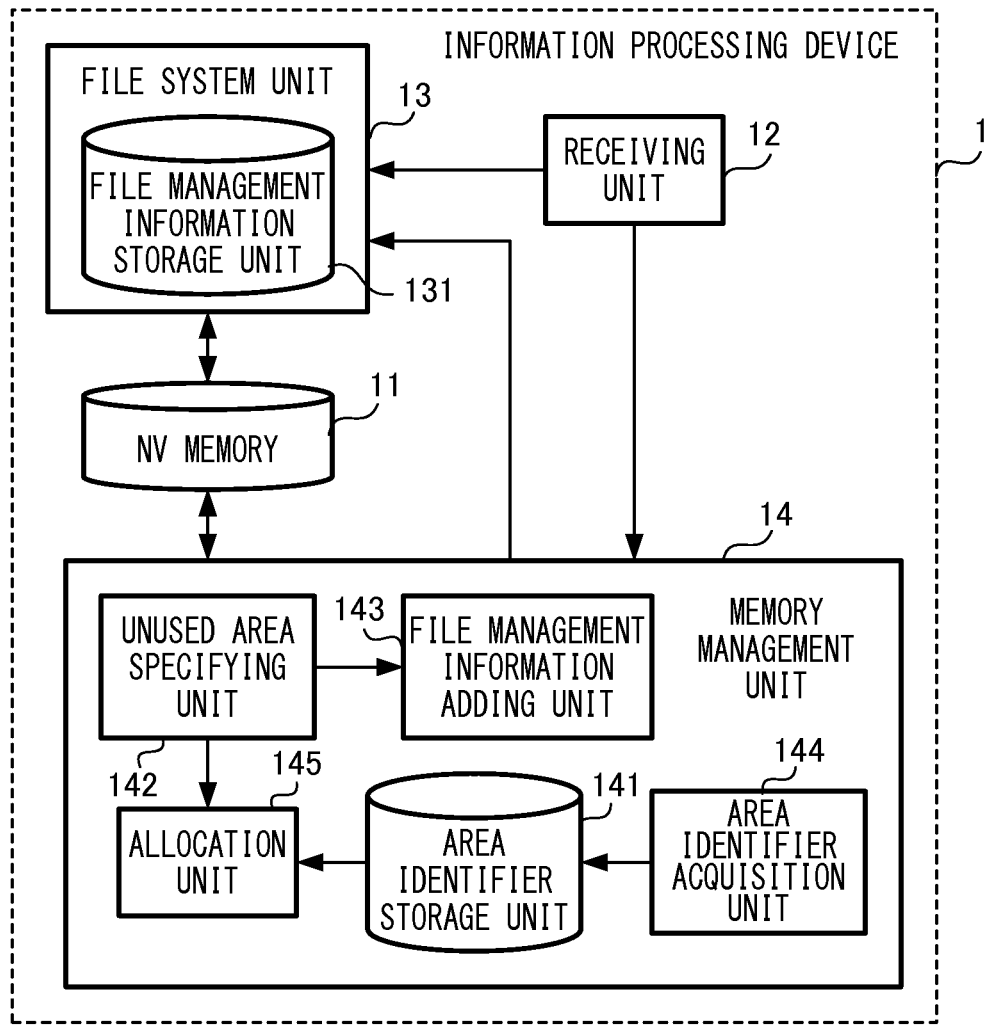
FIG. 1 is a block diagram showing information processing device 1 of embodiment 1.

FIG. 1 is a block diagram of information processing device 1 of the present embodiment. Information processing device 1 comprises NV memory 11, receiving unit 12, file system unit 13 and memory management unit 14. File system unit 13 includes file management information storage unit 131. Memory management unit 14 includes area identifier storage unit 141, unused area specifying unit 142, file management information adding unit 143, area identifier acquisition unit 144 and allocation unit 145.

File system unit 13 and memory management unit 14 of information processing device 1 of the present embodiment may be realized by a so-called OS or a kernel of the OS.

NV memory 11 is a non-volatile storage medium. NV memory 11 may be, for example, a PCM (Phase Change Memory), an MRAM, a ReMAM, an EEPROM, a flash memory, etc. NV memory 11 is not limited in its shape, type, etc., and any non-volatile memory may be used as NV memory 11. Preferably, NV memory 11 is a non-volatile memory accessible in units of a byte.

NV memory 11 has one or more areas. (In the following description, "areas" means "one or more areas.") In the areas, data used by processes are stored. A process may be referred to using other terms such as a job, a task, a thread, etc. Data stored in NV memory 11 may contain a file, a part of a file, a value substituted for a variable, etc. A size (capacity) of an area is predetermined. The size of an area is, for example, 4 KB (kilobytes), 512 B (bytes), etc. An area is used as a block by file system unit 13, and it is used as a page by memory management unit 14. Namely, an area of NV memory is referred to using plural names. In this embodiment, a size of a block and a size of a page are the same. The size is preferably 4 KB.

In the following explanation, each area of NV memory 11 is referred to as "an area of NV memory 11" or "an area." An area storing no data or an area that is allowed to store new data is referred to as an "unused area." An area storing data or an area that is not allowed to store new data is referred to as a "used area."

In general, NV memory 11 is disposed in a physical space, the physical space having continuous physical addresses. "A memory is disposed in a physical space" means that each area of a memory is associated with one of the continuous physical addresses. Namely, each area of NV memory 11 is identified by a physical address. An area of NV memory 11 may be indirectly identified by, for example, a logical address or a virtual address instead of a physical address.

Each area of NV memory 11 is identified by an area identifier. An area identifier is information for identifying an area of NV memory 11. An area identifier is, for example, a physical address, a logical address, or a virtual address. Namely, an area identifier is information that directly or indirectly identifies an area of NV memory 11.

Disposal of NV memory 11 to a physical address space is carried out by, for example, file system unit 13. The disposal may be carried out by, for example, memory management unit 14 or a memory disposing unit that is not shown in FIG. 1.

Receiving unit 12 receives information such as an instruction. An instruction received by receiving unit 12 is, for example, an instruction of execution of a program, an instruction of execution of a process, an instruction of allocation of an area to a process, an instruction of an operation to a file, etc. Receiving unit 12 may receive information such as a command, a parameter of the command, etc. Information received by receiving unit 12 is output from, for example, a program.

File system unit 12 is a file system. The file system is, for example, a disk file system or a local file system. The file system is a PRAMFS (Persistent and Protected RAM File System), an Ext2 (Second Extended File system), a SCMFS (A File System for Storage Class Memory), etc. The file system may support an XIP (eXecute-In-Place) system. Any type of file system may be adopted as file system unit 12 so long as it can manage files stored in NV memory 11. In other words, file system unit 13 uses NV memory 11 as storage for storing files. File system unit 13 may divide an area of NV memory 11 into plural blocks for using the area as storage for storing files.

Since file system unit 13 is a file system, it manages files stored in NV memory 11. Management of files includes writing a file to NV memory 11 in response to a request, reading out a file from NV memory 11 in response to a request, deleting a file from NV memory 11 in response a request, storing information (referred to as a "file management data set" hereinafter) for managing a file to file management information storing unit 131 when the file is written in NV memory 11, deleting a file management data set corresponding to a file from file management information storing unit 131 when the file is deleted from NV memory 11, storing an area identifier of an area storing no file to file management information storing unit 131, acquiring area identifiers of areas storing files from file management information storing unit 131 in response to a request, etc. A deletion of a file from NV memory 11 includes a deletion of a file management data set of a file without deleting the file, an addition of a flag indicating a deletion of a file to a file management data set without deleting the file, etc., as well as an actual deletion of a file.

File system unit 13 is a file system realized by an OS. Accordingly, management of files of file system unit 13 may include any function performed by a file system usually realized by an OS. The file system may be a virtual file system.

A file management data set indicates information for managing a file. A file management data set usually contains a file identifier and area identifiers. Namely, a file identifier is usually related to area identifiers. A file identifier is, for example, a file name described by a combination of letters and numbers. A file identifier is not limited with regard to its format so long as it identifies a file.

A file management data set may include data indicating attributes such as a file creation date, a file update date, access rights (permissions), a name of a user who created a file, etc. The data indicating attributes are related to the file identifier in the file management data set.

When a file is written in NV memory 11, file system unit 13 first determines areas in which the file is written. The areas are unused areas. File system unit 13 divides the file into plural data parts, each of which is written in one of the areas if necessary. Then, file system unit 13 writes the file or the data parts of the file in the respective determined areas.

After the file is written in NV memory 11, file system unit 13 stores a file management data set indicating a correspondence between a file identifier identifying the file written in NV memory 11 and area identifiers identifying the areas in which the file was written in file management information storing unit 131. Usually, the file management data set is newly added to file management data sets stored in file management information storing unit 131.

When a file is read out from NV memory 11, file system unit 13 acquires area identifiers identifying areas in which the file is stored from a file management data set corresponding to the file. Then, file system unit 13 acquires the file or plural parts of the file from the areas identified by the acquired area identifiers.

When a file is deleted from NV memory 11, file system unit 13 acquires area identifiers identifying areas in which the file is stored from a file management data set corresponding to the file. Then, file system unit 13 erases data stored in the areas identified by the acquired area identifiers. File system unit 13 may erase the file by deleting the file management data set without actually erasing the data.

When a file is deleted from NV memory 11, file system unit 13 usually deletes a file management data set containing a file identifier identifying the deleted file from file management information storing unit 131.

When a file is deleted from NV memory 11, file system unit 13 may delete only a file management data set containing a file identifier identifying the file from file management information storing unit 13 without deleting data of the file from NV memory 11. File system unit 13 may delete a file by adding a flag indicating that the file is deleted to a file management data set containing a file identifier identifying the file instead of deleting the file management data set from file management information storing unit 13.

In this embodiment, "failure of a file system" means a situation where consistency of the file system is not maintained. For example, when a file management data set contains area identifiers that are not related to any file identifier, i.e. the file management data set contains only area identifiers, the file system has failed. In other words, when a file management data set indicates that areas are used and the file management data set also indicates that the areas are not used for any file, the file system has failed.

File system unit 13 may manage a file area management data set for managing areas of NV memory 11. In this embodiment, "management of areas" means managing information on whether each of areas of NV memory 11 is unused or used. The file area management data set may contain area identifiers each of which identifies an unused area. Alternatively, the file area management data set may contain area identifiers each of which identifies a used area. Alternatively, the file area management data set may contain area identifiers each of which identifies an unused area or a used area. When the file area management data set contains area identifiers each of which identifies an unused area or a used area, a flag indicating whether an area is unused or used is associated with each of the area identifiers. The file area management data set may be stored in a file area management information storing unit that is not shown in FIG. 1.

When file system unit 13 writes a file in NV memory 11, file system unit 13 may store, to the file area management information storing unit, area identifiers identifying areas where the file is written, as identifiers identifying used areas. When the same area identifiers exist in the file area management information storing unit as the area identifiers that file system unit 13 is ready to store, file system unit 13 may replace the existing area identifiers with the new area identifiers indicating that the areas are used areas. Alternatively, file system unit 13 may add to the existing area identifiers flags indicating that the areas are used areas.

When file system unit 13 deletes a file from NV memory 11, file system unit 13 may store, to the file area management information storing unit, area identifiers identifying areas in which the deleted file was stored, as identifiers identifying unused areas. When the same area identifiers exist in the file area management information storing unit as the area identifiers that file system unit 13 is ready to store, file system unit 13 may replace the existing area identifiers with the new area identifiers indicating that the areas are unused areas. Alternatively, file system unit 13 may add to the existing area identifiers flags indicating that the areas are unused areas.

When file system unit 13 determines areas in which a file is written, file system unit 13 may determine the areas, for example, by use of the above explained file area management information storing unit.

File system unit 13 may perform several processes that are performed by a well-known file system, explanations of which are omitted in this specification.

File management information storage unit 131 stores one or more file management data sets. In the following description, one or more file management data sets may be referred to as a "file management data set group." Details of a file management data set are already explained in the preceding part of this specification, and the explanation is not repeated here.

Memory management unit 14 performs so-called memory management. The memory management includes, for example, securing areas of NV memory 11 in response to a request from a running process, allocating the secured areas to the running process, releasing areas and changing statuses of the areas as unused when a process using the areas is terminated, etc.

In this specification, "to secure areas" means to acquire area identifiers identifying the areas.

A running process usually has a virtual address space. "To allocate areas to a process" usually means to map virtual addresses in a virtual address space of the process to area identifiers, or to allocate the area identifiers to the process. Physical addresses are usually used as area identifiers. When memory management unit 14 allocates areas to a process, it may map a process identifier identifying the process to area identifiers identifying the areas. When memory management unit 14 allocates areas to a process, it stores a data set indicating the correspondence between the process and the allocated areas (referred to as a "memory management data set" hereinafter) to NV memory 11. Allocation of areas may be expressed as area allocation, memory allocation, block allocation, page allocation, etc.

"To release areas from a process" usually means to remove a correspondence between virtual addresses of the process and area identifiers identifying the areas allocated to the process. When memory management unit 14 releases areas from a process, it deletes, from NV memory 11, a memory management data set indicating a correspondence between virtual addresses of the process and area identifiers of the areas allocated to the process.

A memory management data set indicates information used for managing unused areas and used areas of NV memory 11. A memory management data set usually includes, at least, one or more virtual addresses and one or more physical addresses. (In the following description, "addresses" means "one or more addresses.") The virtual addresses are respectively associated with the physical addresses. A process identifier identifying the process may be associated with the physical addresses instead of or in addition to the virtual addresses. A process name or a process number is usually used as a process identifier. However, any type of identifier may be used as a process identifier so long as a process is identified by the identifier. A memory management data set may indicate either one correspondence between a group of virtual addresses and a group of physical addresses or plural correspondences between plural groups of virtual addresses and plural groups of physical addresses.

Areas that may be secured for a process are areas that may also be used by file system unit 13 for storing a file. "Areas that may be used for storing a file" may be, for example, areas where a file may be written, areas where a file has been written, or areas storing data that may be treated as a file. The areas may be either unused areas or used areas. Memory management unit 14 usually secures areas for a process via file system unit 13. "To secure areas for a process via file system unit 13" means to secure areas by use of file management data sets stored in file management information storage unit 131.

Memory management unit 14 further performs management of areas allocated to processes, unused areas, used areas, etc. This management may include, for example, storing a data set indicating a correspondence between virtual addresses and area identifiers to predetermined areas, storing area identifiers indicating unused areas to predetermined areas, storing area identifiers indicating used areas to predetermined areas, etc. These predetermined areas are usually areas of NV memory 11.

Memory management unit 14 may perform several processes that are performed by a well-known memory manager, explanations of which are omitted in this specification. Memory management unit 14 usually performs processes such as securing areas for a process, allocating the secured areas to the process, releasing the allocated areas from the process, etc. by use of functional components that are explained later in this specification.

Area identifier storage unit 141 stores area identifiers. Details of an area identifier are already explained earlier in this specification, and they are not repeated here. Physical addresses are usually used as area identifiers.

Unused area specifying unit 142 specifies unused areas in NV memory 11, and acquires area identifiers identifying the unused areas. "To specify unused areas" may be expressed as "to detect unused areas." Unused area specifying unit 142 usually specifies a suitable number of areas in accordance with a size requested from a process. "A suitable number of areas in accordance with a size requested from a process" means a certain number of areas that can store data of the requested size. Namely, a size of unused areas specified by unused area specifying unit 142 is equal to or more than the requested size, and a difference between the size of unused areas and the requested size is as small as possible. Unused area specifying unit 142 usually acquires area identifiers identifying the unused areas by use of file management data sets stored in file management information storage unit 131.

Unused area specifying unit 142 acquires area identifiers identifying areas of NV memory 11. The area identifiers are, for example, stored in NV memory 11 in advance. Unused area specifying unit 142 selects, from among the acquired area identifiers, area identifiers that are not included in the file management data sets.

For example, in an exemplary case, it is assumed that a physical address space where NV memory 11 is disposed has physical addresses "0xF0000001," "0xF0000002," "0xF0000003" and "0xF0000004." It is also assumed that the file management data sets include physical addresses "0xF0000001" and "0xF0000004." It is further assumed that a size of each area of NV memory 11 is 4 KB, and a size requested from a process is 3 KB. In this exemplary case, a number of areas that should be secured is one. Accordingly, unused area specifying unit 142 specifies two areas identified by physical addresses "0xF0000002" and "0xF0000004" as unused areas. Unused area specifying unit 142 acquires one of these physical addresses.

The physical address that unused area specifying unit 142 acquires is usually allocated to the process that made the request. The allocation is usually performed by allocation unit 145. Alternatively, the allocation may be performed by unused area specifying unit 142.

File management information adding unit 143 adds a file management data set to file management information storage unit 131. "To add a file management data set" means to store a new file management data set in file management information storage unit 131; namely, to add a new file management data set to a file management data set group already stored in file management information storage unit 131. A file management data set includes a file identifier and area identifiers in association with the file identifier. A file identifier included in a file management data set is usually one of file identifiers stored in file management information storage unit 131. Area identifiers included in a file management data set are usually area identifiers acquired by unused area specifying unit 142.

File management information adding unit 143 adds a file management data set to file management information storage unit 131 by performing, for example, the following steps:

(a-1) File management information adding unit 143 acquires area identifiers;

(a-2) File management information adding unit 143 acquires one file identifier that is not associated with any area identifier from among file identifiers contained in file management data sets;

(a-3) File management information adding unit 143 creates a file management data set by associating the area identifiers acquired in step (a-1) with the file identifier acquired in step (a-2); and (a-4) File management information adding unit 143 adds the created file management data set to file management information storage unit 131.

Alternatively, file management information adding unit 143 may add a file management data set to file management information storage unit 131 by performing, for example, the following steps:

(b-1) File management information adding unit 143 acquires area identifiers from unused area specifying unit 142;

(b-2) File management information adding unit 143 adds the area identifiers acquired in step (b-1) to file management information storage unit 131;

(b-3) File management information adding unit 143 acquires a file identifier that is not associated with any area identifier from among file identifiers contained in file management data sets; and (b-4) File management information adding unit 143 associates the file identifier acquired in step (b-3) with the area identifiers added to file management information storage unit 131 in step (b-2).

"To add area identifiers" in step (b-2) means to add a new file management data set containing area identifiers to the file management data set group stored in file management information storage unit 131.

"To associate a file identifier with area identifiers" means to add a file identifier to a file management data set containing area identifiers stored in file management information storage unit 131 in step (b-2).

A file identifier acquired in each of steps (a-2) and (b-3) is selected in accordance with a predetermined rule, such as to select a file identifier randomly, to select a file identifier in a predetermined order, etc. The predetermined order for selecting a file identifier may be ascending or descending order of a file identifier, a date on which a file identifier is created, etc.

File management information adding unit 143 may add a file management data set in any procedures other than the above explained exemplary procedures so long as a file management data set containing a file identifier and area identifiers associated with the file identifier is added to file management information storage unit 131 as a result.

Area identifier acquisition unit 144 acquires area identifiers from file management information storage unit 131. Area identifiers acquired by area identifier acquisition unit 144 are area identifiers contained in a file management data set stored in file management information storage unit 131. Area identifier acquisition unit 144 stores the acquired area identifiers in area identifier storage unit 141.

Area identifier acquisition unit 144 may acquire area identifiers in any one of two methods for securing areas (referred to as "securing methods" hereinafter) explained below. In the following description, one of the securing methods is referred to as "secure in-advance method," and the other of the securing methods is referred to as "secure on-demand method."

When area identifier acquisition unit 144 acquires area identifiers in the secure in-advance method, area identifier acquisition unit 144 acquires, for example, at a timing determined in accordance with a predetermined rule, all area identifiers from file management information storage unit 131. The timing determined in accordance with a predetermined rule is usually at a timing when information processing device 1 is started. However, the timing determined in accordance with a predetermined rule is not limited to the above-mentioned timing, but it may be any other timing such as a timing while information processing device 1 is operating, a timing when a process receives an execution request at the first time, a timing when the process is started in response to the execution request, etc.

When area identifier acquisition unit 144 acquires area identifiers in the secure on-demand method, area identifier acquisition unit 144 acquires area identifiers in response to a request from a running process. When area identifier acquisition unit 144 receives a request from a running process, area identifier acquisition unit 144 checks whether any area identifier is stored in area identifier storage unit 141. In a case where no area identifier is stored in area identifier storage unit 141, area identifier acquisition unit 144 acquires area identifiers, whose number corresponds to a size indicated by the request.

Areas identified by the area identifiers acquired by area identifier acquisition unit 144 are usually allocated to a process that made the request. The allocation is usually performed by allocation unit 145 as explained below. Alternatively, the allocation may be performed by area identifier acquisition unit 144.

Allocation unit 145 allocates areas to a running process in response to a request from the process. Allocation unit 145 stores a process management data set indicating a result of the allocation to a predetermined area. The predetermined area is usually an area of NV memory 11.

In a method for allocating areas to a process (referred to as an "allocation method" hereinafter), allocation unit 145 allocates areas identified by area identifiers specified by unused area specifying unit 142 to the process that made the request. This allocation method is referred to as "semi-direct fusion method" in the following description in this specification. In a semi-direct fusion method, file management information adding unit 143 adds a file management data set containing area identifiers specified by unused area specifying unit 142 and a file identifier in association with the area identifiers to file management information storage unit 131 in addition to the allocation of areas performed by allocation unit 145. In another allocation method, file management information adding unit 143 adds a file management data set containing area identifiers, but not containing any file identifier, to file management information storage unit 131. This method is referred to as "direct fusion method" in the following description in this specification. Namely, in a direct fusion method, areas identified by area identifiers specified by unused area specifying unit 142 are allocated to a process, and a file management data set containing the area identifiers is added to file management information storage unit 131. In a semi-direct fusion method, in addition to the allocation, a file management data set containing the area identifiers and a file identifier is added to file management information storage unit 131.

In another allocation method, allocation unit 145 allocates, to a process that made a request, areas identified by area identifiers selected from among area identifiers that are acquired by area identifier acquisition unit 144 and stored in area identifier storage unit 141. This method is referred to as "indirect fusion method" in the following description in this specification. Allocation unit 145 deletes area identifiers identifying the areas allocated to the process from area identifier storage unit 141.

For example, when area identifier acquisition unit 144 acquires area identifiers in the secure in-advance method, allocation unit 145 acquires area identifiers of a number matching a size requested from a process, from among area identifiers stored in area identifier storage unit 141. Allocation unit 145 allocates to the process that made the request areas identified by the acquired area identifiers.

For example, when area identifier acquisition unit 144 acquires area identifiers in the secure on-demand method, allocation unit 145 allocates to a process that made a request areas identified by area identifiers stored in area identifier storage unit 141.

In another allocation method, allocation unit 145 instructs, for example, in response to a request from a running process, file system unit 13 to write a file of the same size as that requested by the process in NV memory 11. "To write a file" means to create a file. In response to the instruction, allocation unit 145 receives area identifiers identifying areas where the file is written from file system unit 13. Then, allocation unit 145 allocates to the process that made the request areas identified by the received area identifiers. This allocation method is referred to as "mmap method" in the following description in this specification.

Memory management unit 14 may store memory area management data sets that are data sets used for managing areas. Data format of a memory area management data set is the same as that of a file area management data set, and details of the format are not repeated here. Alternatively, memory area management data sets may be stored in a memory area management information storing unit that is not shown in FIG. 1.

When allocation unit 145 allocates areas to a process, allocation unit 145 stores area identifiers identifying the allocated areas in the memory area management information storing unit as area identifiers indicating used areas. When the same area identifiers are already stored in the memory area management information storing unit, allocation unit 145 may replace the area identifiers with the new area identifiers indicating used areas, or it may add to the existing area identifiers flags indicating used areas in the memory area management information storing unit.

When a running process is terminated, allocation unit 145 stores area identifiers identifying areas allocated to the terminated process to the memory area management information storing unit as area identifiers indicating unused areas. When the same area identifiers are already stored in the memory area management information storing unit, allocation unit 145 may replace the area identifiers with the new area identifiers indicating unused areas, or it may add to the existing area identifiers flags indicating unused areas in the memory area management information storing unit.

When allocation unit 145 selects areas to be allocated to a process, memory area management data sets may used for the selection.

Receiving unit 12 may acquire in various ways information such as an instruction input by a user, such as a via a menu screen, a keyboard, etc. Namely, receiving unit 12 may be realized by a program for controlling a menu screen, a device driver for a data input device such as a keyboard, etc.

File system unit 13, memory management unit 14, unused area specifying unit 142, file management information adding unit 143, area identifier acquisition unit 144 and allocation unit 145 are usually realized by a processor such as MPU, memory, etc. Procedures performed by the above components of information processing device 1 such as file system unit 13 are usually instructed by programs. The programs may be provided in a form being recorded in a recording medium such as a ROM. Alternatively, the above components of information processing device 1 such as file system unit 13 may be realized by hardware such as circuits designed for the components.

File management information storage unit 131 and area identifier storage unit 141 are usually realized by areas of NV memory 11. Alternatively, file management information storage unit 131 and/or area identifier storage unit 141 may be realized by a memory other than NV memory 11, which is either a non-volatile memory or a volatile memory. File management information storage unit 131 and area identifier storage unit 141 may acquire data through various routes, such as a recording medium recording the data, a communication line for transmitting the data, an input device for receiving data input by a user, etc.

Figure 2:
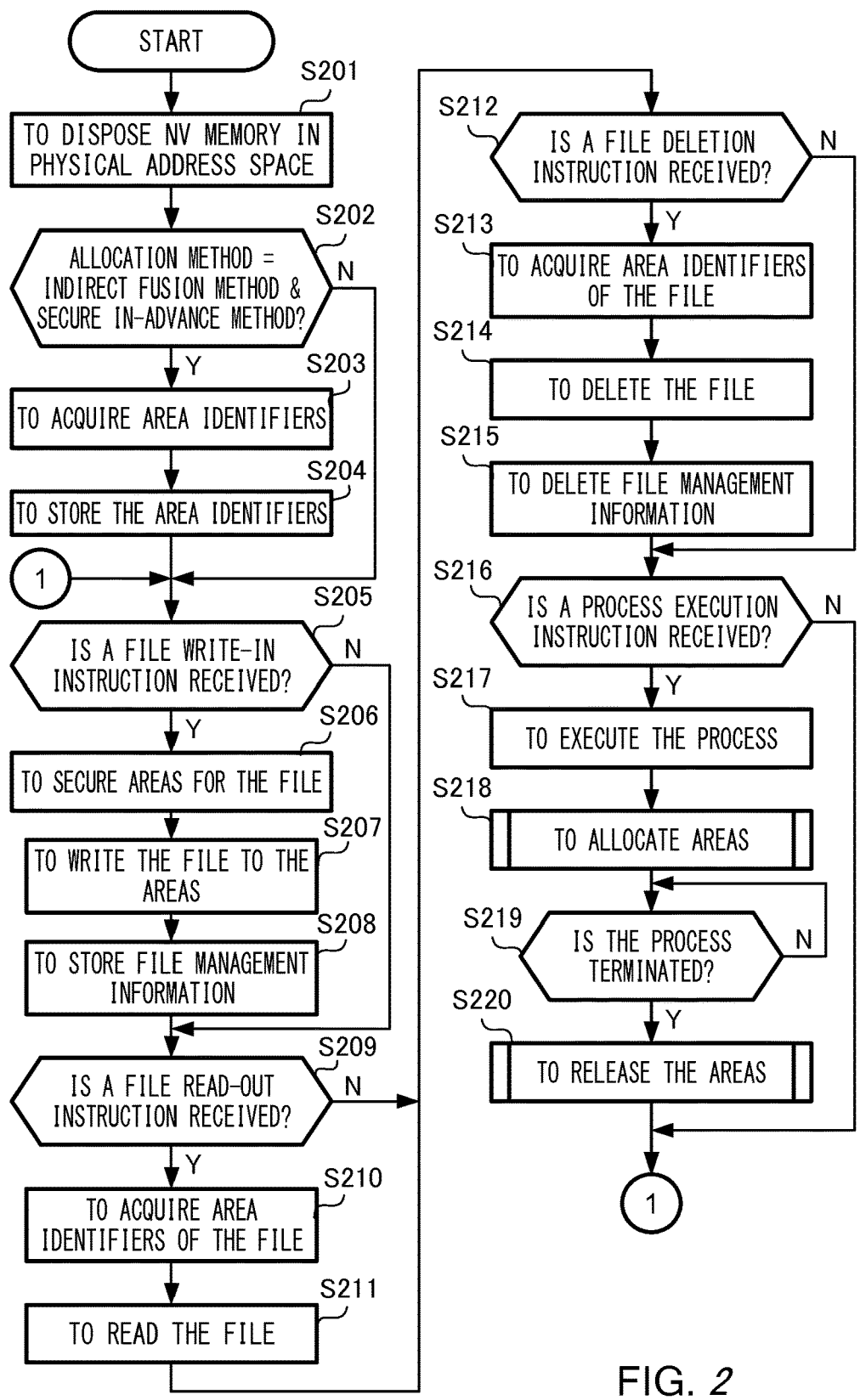
FIG. 2 is a flow chart showing processes conducted by information processing device 1 of embodiment 1.

Operations of information processing device 1 are explained below with reference to flowcharts. FIG. 2 is a flowchart showing a series of procedures carried out by information processing device 1. In the flowcharts, including that of FIG. 2, that are referred to in the following explanation, a judging procedure is shown in a box of hexagonal shape instead of a box, due to limited space, instead of a box of rhomboidal shape defined by JIS (Japanese Industrial Standards).

(Step S210) File system unit 13 disposes NV memory 11 in a physical address space. The disposal may be performed by memory management unit 14 instead of file system unit 13.

(Step S202) Memory management unit 14 judges whether or not an adopted method for allocating areas to a process is the indirect fusion method with the secure in-advance method. For example, when a data set indicating the adopted method for allocating areas to a process is stored in a predetermined area, memory management unit 14 refers to the data set to perform the judgment in this step. If the adopted method is not the indirect fusion method with the secure in-advance method, step S203 is carried out next; otherwise, step S205 is carried out next.

(Step S203) Area identifier acquisition unit 144 acquires all area identifiers stored in file management information storage unit 131.

(Step S204) Area identifier acquisition unit 144 stores the acquired area identifiers to area identifier storage unit 141.

(Step S205) File system unit 13 judges whether or not receiving unit 12 receives a file write-in instruction. A file write-in instruction instructs writing of a file in NV memory 11. A file write-in instruction usually contains a file identifier and a data set indicating contents of the file. If receiving unit 12 receives a file write-in instruction, step S206 is carried out next; otherwise, step S209 is carried out next.

(Step S206) File system unit 13 acquires area identifiers for securing areas for writing the file.

(Step S207) File system unit 13 writes the file in areas identified by the area identifiers acquired in step S206.

(Step S208) File system unit 13 associates the area identifiers acquired in step S206 with a file identifier identifying the file written in the areas in step S207 to create a file management data set, and stores the file management data set in file management information storage unit 131.

(Step S209) File system unit 13 judges whether or not receiving unit 12 receives a file read-out instruction. A file read-out instruction instructs reading of a file from NV memory 11. A file read-out instruction usually contains a file identifier. If receiving unit 12 receives a file read-out instruction, step S210 is carried out next; otherwise, step S212 is carried out next.

(Step S210) File system unit 13 acquires, from file management information storage unit 131, area identifiers identifying areas that store the file to be read out.

(Step S211) File system unit 13 reads out the file from areas identified by the area identifiers acquired in step S210.

(Step S212) File system unit 13 judges whether or not receiving unit 12 receives a file deletion instruction. A file deletion instruction instructs deletion of a file from NV memory 11. A file deletion instruction usually contains a file identifier. If receiving unit 12 receives a file deletion instruction, step S213 is carried out next; otherwise, step S216 is carried out next.

(Step S213) File system unit 13 acquires, from file management information storage unit 131, area identifiers identifying areas that store the file to be deleted.

(Step S214) File system unit 13 deletes the file from the area identified by the area identifiers acquired in step S213.

(Step S215) File system unit 13 deletes a file management data set containing the area identifiers acquired in step S213 from file management information storage unit 131.

(Step S216) Memory management unit 14 judges whether or not receiving unit 12 receives a process execution instruction. A process execution instruction instructs execution of a process. A process execution instruction usually contains a process identifier. If receiving unit 12 receives a process execution instruction, step S217 is carried out next; otherwise, step S205 is carried out next.

(Step S217) Information processing device 1 executes the process.

(Step S218) Memory management unit 14 allocates areas to the running process in response to a request from the process. Details of the procedure carried out in step S218 will be explained later with reference to a flowchart shown in FIG. 3.

(Step S219) Memory management unit 14 judges whether or not the process is terminated. If the process is terminated, step S220 is carried out next; otherwise, step S219 is carried out next.

(Step S220) Memory management unit 14 releases areas allocated to the terminated process. Details of the procedure carried out in step S220 will be explained later with reference to a flowchart shown in FIG. 4.

The above-explained procedure flow shown in FIG. 2 may be terminated at any time because of, for example, a cut-off of power supply, an interrupting process, etc.

Figure 3:
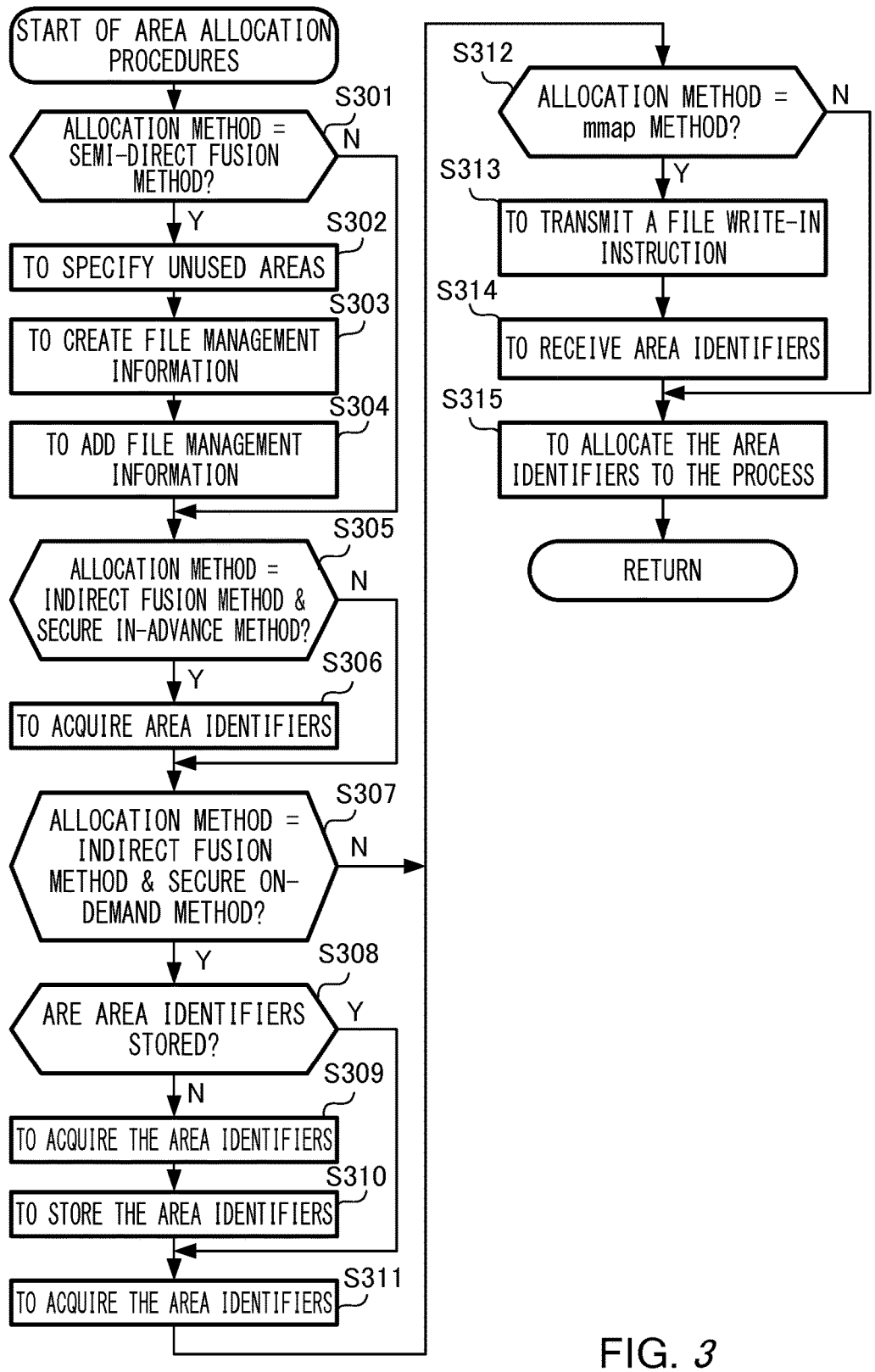
FIG. 3 is a flow chart showing processes for allocating an area to a process in embodiment 1.

FIG. 3 is a flowchart showing a series of procedures for allocating areas to the process carried out by information processing device 1 in step S218 of FIG. 2.

(Step S301) Memory management unit 14 judges whether or not an adopted method for allocating areas to the process is the semi-direct fusion method. If the adopted method is the semi-direct fusion method, step S302 is carried out next; otherwise, step S305 is carried out next.

(Step S302) Unused area specifying unit 142 specifies unused areas of a number meeting with a size requested from the process by use of file management data sets stored in file management information storage unit 131, and acquires area identifiers identifying the specified unused areas.

(Step S303) File management information adding unit 143 associates area identifiers acquired in step S302 with a file identifier contained in a file management data set to create a new file management data set.

(Step S304) File management information adding unit 143 adds the file management data set created in step S303 to file management information storage unit 131.

(Step S305) Memory management unit 14 judges whether or not an adopted method for allocating areas to the process is the indirect fusion method with the secure in-advance method. If the adopted method for allocating areas to the process is the indirect fusion method with the secure in-advance method, step S306 is carried out next; otherwise, step S307 is carried out next.

(Step S306) Allocation unit 145 acquires, from area identifier storage unit 141, area identifiers of a number meeting with a size requested from the process.

(Step S307) Memory management unit 14 judges whether or not an adopted method for allocating areas to the process is the indirect method with the secure on-demand method. If the adopted method for allocating areas to the process is the indirect method with the secure on-demand method, step S308 is carried out next; otherwise, step S312 is carried out next.

(Step S308) Area identifier acquisition unit 144 judges whether or not any area identifier is stored in area identifier storage unit 141. If any area identifier is stored in area identifier storage unit 141, step S311 is carried out next; otherwise, step S309 is carried out next.

(Step S309) Area identifier acquisition unit 144 acquires, from file management information storage unit 131, area identifiers of a number meeting with a size requested from the process.

(Step S310) Area identifier acquisition unit 144 stores area identifiers acquired in step S309 in area identifier storage unit 141.

(Step S311) Allocation unit 145 acquires, from area identifier storage unit 141, area identifiers of a number meeting with a size requested from the process. Allocation unit 145 deletes the acquired area identifiers from area identifier storage unit 141. Allocation unit 145 may delete the area identifiers by adding flags indicating deleted areas.

(Step S312) Memory management unit 14 judges whether or not an adopted method for allocating areas to the process is the mmap method. If the adopted method is the mmap method, step S313 is carried out next; otherwise, step 315 is carried out next.

(Step S313) Allocation unit 145 generates a file write-in instruction to write a file of the size requested from the process, and transmits the file write-in instruction to file system unit 13.

(Step S314) Allocation unit 145 receives area identifiers identifying areas where the file is written from file system unit 13.

(Step S315) Allocation unit 145 allocates areas identified by area identifiers acquired in step S302, step S306, step S311 or step S314 to the process that made the request. Allocation unit 145 usually stores a memory management data set indicating a result of the allocation to a memory management information storage unit that is not shown in FIG. 1. Then, information processing device 1 returns to the flow shown in FIG. 2 and step S219 is carried out next.

FIG. 4 is a flowchart showing a series of procedures carried out in step S220 in the flowchart of FIG. 2.

(Step S401) Allocation unit 145 judges whether or not an adopted method for allocating areas to the process is the semi-direct fusion method. If the adopted method is the semi-direct fusion method, step S402 is carried out next; otherwise, step S404 is carried out next.

(Step S402) Allocation unit 145 deletes, from file management information storage unit 131, a file management data set containing area identifiers identifying areas allocated to the process.

(Step S403) Allocation unit 145 deletes, from the memory management information storage unit (not shown in FIG. 1), a memory management data set containing area identifiers identifying areas allocated to the process.

(Step S404) Allocation unit 145 judges whether or not an adopted method for allocating areas to the process is the indirect fusion method. If the adopted method is the indirect fusion method, step S405 is carried out next; otherwise, step S408 is carried out next.

(Step S405) Allocation unit 145 acquires, from the memory management information storage unit (not shown in FIG. 1), area identifiers identifying areas allocated to the process.

(Step S406) Allocation unit 145 stores the area identifiers acquired in step S405 to area identifier storage unit 141. Alternatively, allocation unit 145 may delete flags indicating deleted areas.

(Step S407) Allocation unit 145 deletes from the memory management information storage unit (not shown in FIG. 1), the area identifiers acquired in step S405.

(Step S408) Allocation unit 145 judges whether or not an adopted method for allocating areas to the process is the mmap method. If the adopted method is the mmap method, step S409 is carried out next; otherwise, information processing device 1 returns to the flow shown in FIG. 2.

(Step S409) Allocation unit 145 acquires, from the memory management information storage unit (not shown in FIG. 1), area identifiers identifying areas allocated to the process.

(Step S410) Allocation unit 145 transmits, to file system unit 13, a file deletion instruction to delete a file written in areas identified by the area identifiers acquired in step S409.

(Step S411) Allocation unit 145 deletes, from the memory management information storage unit (not shown in FIG. 1), the memory management data set containing area identifiers acquired in step S409. Then, information processing device 1 returns to the flow shown in FIG. 2.

EXAMPLES

Some exemplary operations of information processing device 1 are explained below. In the following exemplary operations, it is assumed that NV memory 11 is disposed in a physical address space, and a size of each area of NV memory 11 is 4 KB.

Example 1

An exemplary operation of information processing device 1 where areas are allocated to a process in the semi-direct fusion method is explained below as example 1. In example 1, it is assumed that file management information storage unit 131 stores file management data sets shown in FIG. 5. Each of the file management data sets shown as a data record in the data table shown in FIG. 5 contains an ID identifying the data record, a file identifier (identified by a data field name "file") and a physical address. A physical address contained in a file management data set functions as an area identifier. The file management data sets shown in FIG. 5 indicate that, for example, a file identified by a file identifier "file01" is stored in three areas identified by physical addresses "0x00000001," "0x00000002" and "0x00000003."

It is assumed that a user performs operations for instructing information processing device 1 to execute a program. In this case, receiving unit 12 receives a process execution instruction to instruct the program to be executed as a process. It is assumed that the received process execution instruction contains a process identifier "proc01." In this case, information processing device 1 executes a program identified by the process identifier as a process.

Then, it is assumed that the running process requests areas of 10 KB. In this case, receiving unit 12 receives an area allocation instruction to allocate areas to the process. The area allocation instruction contains the process identifier "proc01" and a data set indicating the requested size of areas "10 KB."

Unused area specifying unit 142 specifies unused areas of a number meeting with the requested size "10 KB" by use of the file management data sets shown in FIG. 5, and acquires physical addresses identifying the specified areas. Since a size of each area of NV memory 11 is "4 KB," unused area specifying unit 142 acquires three physical addresses. It is assumed that any area that is not identified by any physical address shown in FIG. 5 is an unused area, and unused area specifying unit 142 acquires physical addresses "0x00000004," "0x00000005" and "0x00000006."

Next, file management information adding unit 143 acquires any one of the file identifiers contained in the file management data sets shown in FIG. 5. It is assumed that file management information adding unit 143 acquires the first file identifier in ascending order of a file identifier in accordance with a predetermined rule, and it acquires "ID=001" here.

Next, file management information adding unit 143 associates the acquired physical addresses, i.e. "0x00000004," "0x00000005" and "0x00000006," with the acquired file identifier, i.e. "file01" to create new file management data sets. File management information adding unit 143 stores the new file management data sets in file management information storage unit 131. Namely, the new file management data sets are added to the file management data sets shown in FIG. 5. FIG. 6 shows the file management data sets after the new file management data set is added. In FIG. 6, data records identified by "ID=008" to "ID=010" are the added file management data sets.

Next, allocation unit 145 allocates the three areas identified by the three physical addresses acquired by unused area specifying unit 142 to the process identified by process identifier "proc01." Allocation unit 145 stores memory management data sets indicating a result of the allocation to the memory management information storage unit (not shown in FIG. 1). FIG. 7 shows the stored memory management data sets. Each of the memory management data sets contains an ID identifying the data record, a process identifier (identified by the data field name "process"), a virtual address and a physical address. The memory management data sets indicate that a virtual addresses "0xF0000001," "0xF0000002" and "0xF0000003" in a virtual address space of a process identified by process identifier "proc01" are associated with physical addresses "0x00000004," "0x00000005" and "0x00000006" respectively.

Example 2

An exemplary operation of information processing device 1, where areas are allocated to a process in the indirect fusion method, is explained below as example 2. In example 2, it is assumed that file management information storage unit 131 stores file management data sets shown in FIG. 5.

First, a case where the secure in-advance method is adopted as a securing method is explained. Similarly to the case of example 1, it is assumed that a user makes operations for instructing information processing device 1 to execute a program. Since details of the process execution instruction, etc. received by receiving unit 12 are the same as in the case of example 1, they are not repeated here.

Next, area identifier acquisition unit 144 acquires all physical addresses contained in the file management data sets shown in FIG. 5, seven physical addresses in this case. Then, area identifier acquisition unit 144 stores the acquired physical addresses in area identifier storage unit 141.

Next, allocation unit 145 acquires, from area identifier storage unit 141, three physical addresses whose number meets with the size requested from the process identified by process identifier "proc01," i.e. "10 KB." It is assumed that allocation unit 145 acquires physical addresses "0x00000011," "0x00000012" and "0x00000013." Allocation unit 145 deletes the physical addresses from area identifier storage unit 141. Allocation unit 145 may delete the physical addresses by adding flags indicating deleted areas to the physical addresses.

Next, allocation unit 145 allocates three areas identified by the acquired physical addresses to the process identified by process identifier "proc01." Then, allocation unit 145 stores memory management data sets indicating a result of the allocation in the memory management information storage unit (not shown in FIG. 1). FIG. 8 shows the stored memory management data sets. A data format of the memory management data sets shown in FIG. 8 is the same as that of the memory management data sets shown in FIG. 7, and details of the data format are not repeated here.

When the running process identified by process identifier "proc01" is terminated, allocation unit 145 acquires, from the memory management data sets shown in FIG. 8, physical addresses "0x00000011," "0x00000012" and "0x00000013" corresponding to process identifier "proc01." Then, allocation unit 145 deletes the memory management data sets shown in FIG. 8 from the memory management information storage unit.

Next, allocation unit 145 stores the acquired physical addresses in area identifier storage unit 141. Alternatively, allocation unit 145 may delete flags indicating deleted areas from the acquired physical addresses.

Second, a case where the secure on-demand method is adopted as a securing method is explained. Similarly to the above case, it is assumed that a process identified by process identifier "proc01" is running, and the process requests areas of "10 KB."

Area identifier acquisition unit 144 judges whether or not any area identifier is stored in area identifier storage unit 141. It is assumed that area identifier acquisition unit 144 judges that no identifier is stored in area identifier storage unit 141.

In this case, area identifier acquisition unit 144 acquires, from file management data sets shown in FIG. 5, physical addresses of a number meeting with a size requested from a process identified by process identifier "proc01," i.e. "10 KB." It is assumed that area identifier acquisition unit 144 acquires physical addresses "0x00000011," "0x00000012" and "0x00000013." In this case, area identifier acquisition unit 144 stores the physical addresses in area identifier storage unit 141.

Next, allocation unit 145 acquires physical addresses "0x00000011," "0x00000012" and "0x00000013" from area identifier storage unit 141. Allocation unit 145 deletes the physical addresses from area identifier storage unit 141.

Next, allocation unit 145 allocates areas identified by the acquired physical addresses to the process identified by process identifier "proc01." Then, allocation unit 145 stores memory management data sets indicating a result of the allocation in the memory management information storage unit (not shown in FIG. 1). FIG. 8 shows the stored memory management data sets.

The memory management data sets are deleted when the process is terminated in the same way as in the above case, and details of the deletion of memory management data sets are not repeated here.

Example 3

An exemplary operation of information processing device 1 where areas are allocated to a process in the mmap method is explained below as example 3. In example 3, it is assumed that file management information storage unit 131 stores file management data sets shown in FIG. 5.

Similarly to the above-explained example 1, it is assumed that a process identified by process identifier "proc01" is running, and the process requests areas of "10 KB."

Allocation unit 145 generates a file write-in instruction to write a file of 10 KB to NV memory 11, and transmits the file write-in instruction to file system unit 13. The file write-in instruction contains a data set indicating the size of file, i.e. "10 KB."

Receiving unit 12 receives the file write-in instruction. File system unit 13 acquires a file identifier following the file write-in instruction. File system unit 13 acquires physical addresses indicating unused areas of a number meeting the size of file, i.e. "10 KB" by use of the file management data sets shown in FIG. 5. It is assumed that file system unit 13 acquires file identifier "file99" and physical addresses "0x00000004," "0x00000005" and "0x00000006."

Figures 9, 10, 11, 12, 13:
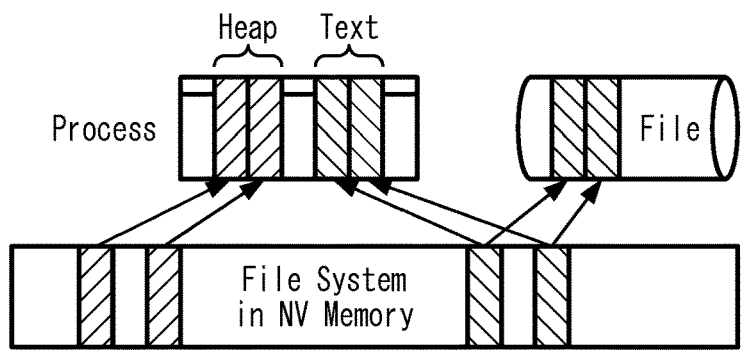
FIG. 9 illustrates examples of file management data sets in embodiment 1.
FIG. 10 illustrates an example of structure of a system in embodiment 1.
FIG. 11 illustrates an example of a prototype declaration of function in embodiment 1.
FIG. 12 illustrates an example of a call for function in embodiment 1.
FIG. 13 illustrates an example of a command for changing a threshold value in embodiment 1.

Next, file system unit 13 writes a file in the areas identified by the acquired physical addresses. File system unit 13 generates file management data sets indicating a result of the writing of a file, and stores the file management data sets in file management information storage unit 131. Namely, file system unit 13 adds the new file management data sets to the file management data sets shown in FIG. 5. FIG. 9 shows the file management data sets after the addition of new file management data sets. Details of format of the file management data sets are not repeated here.

File system unit 13 transmits, to memory management unit 14, the physical addresses identifying the areas where the file is written.

Next, allocation unit 145 receives physical addresses "0x00000004," "0x00000005" and "0x00000006." Allocation unit 145 allocates the areas identified by the physical addresses to the process identified by process identifier "proc01." Then, allocation unit 145 stores memory management data sets indicating a result of the allocation in the memory management information storage unit (not shown in FIG. 1). FIG. 7 shows the stored memory management data sets.

The memory management data sets are deleted when the process is terminated in the same way as in the above explained examples 1 and 2, and details of the deletion of memory management data sets are not repeated here.

Example 4

Now, an exemplary configuration of information processing device 1 is explained below. In this example, NV memory 11 may be referred to as an "NV memory." Information processing device 1 is, for example, realized by a kernel of Linux ("Linux" is a registered trademark in Japan).

FIG. 10 shows an exemplary configuration of information processing device 1. Information processing device 1 shown in FIG. 10 is a system where an NV memory and a file system are integrated. Information processing device 1 manages areas of the NV memory by use of the file system for the purpose of using areas of the NV memory as both a storage and a main memory without separating the areas of NV memory into areas for the storage and for the main memory. When a file is stored in the NV memory by use of the file system, blocks are allocated for storing data of the file using a known method. Data contained in the file such as a program text can be directly accessed as data memorized in the main memory in a method such as XIP. When more free memory space is required, free blocks are acquired from the file system. The process shown in FIG. 10 maps a file of a text to the NV memory by XIP, and with regard to heap areas, it acquires free blocks and maps the free blocks as heap areas to the NV memory. In this example, both free memory areas and free blocks are unused areas of the NV memory.

An implementation of the semi-direct fusion method is explained below. To implement the semi-direct fusion method, a function for securing blocks from the file system, a function for associating references to the blocks with a file that is created in advance, and a function for releasing the association between the references to the blocks and the file are required. The function for securing blocks from the file system is realized by an implementation of the direct fusion method. A file with which references to blocks are associated and a file from which references to blocks are released are appointed by a user. A function for receiving the appointment from the user is implemented as a char device driver.

Interface "ioctl" of the device driver is used for receiving a file identifier of a file to which a reference to blocks is added or a file identifier of a file from which a reference to blocks is released. FIG. 11 shows an example of a prototype declaration of the function using interface "ioctl."

The function shown in FIG. 11 receives a file descriptor as a file identifier. The value of the file descriptor is received as the third parameter "arg." The function acquires a file structure from the file descriptor by use of function "fget( )." A file structure indicates substantial contents of the file, and an Mode number, a function for handling a file, etc., are found in the file structure. Since Mode is a known data structure of a file system, details of Mode are not explained here. A user can designate an adopted method for allocating areas to a process, either the semi-direct fusion method or indirect fusion method (with the secure in-advance method or the secure on-demand method), by the second parameter "cmd."

In the semi-direct fusion method, references to secured blocks are added to a file by using an offset of the secured blocks in the file system as an offset in the file to which the references to the secured blocks are added. The functions for adding references to a file and for releasing references from a file may vary depending on internal structure of the file system. Accordingly, the functions must be developed for each type of file system such as Ext2, PRAMFS, etc. An internal structure of PRAMFS is comparatively simple. Accordingly, when PRAMFS is used as the file system, a function that directly handles an Mode of a file may be developed. On the other hand, an internal structure of Ext2 is comparatively complicated. Accordingly, it is better to use existing codes as far as possible for realizing the functions for adding references to a file and for releasing references from a file. Therefore, when Ext2 is used as the file system, some redundant procedures for securing and releasing blocks are inevitably carried out.

Next, an implementation of the indirect fusion method is explained below. To implement the indirect fusion method, both in the cases where the secure in-advance method is adopted and where the secure on-demand method is adopted, a function for acquiring addresses of blocks allocated to a file and a function for managing free blocks for allocating areas to a process are required. A file identifier identifying a file used for allocating areas to a process is received by the same device driver as used in the semi-direct fusion method. With regard to the interface to receive a request for allocating areas and a request for releasing areas from a process via a memory allocator, the same interface is used in the indirect fusion method as used in the direct fusion method.

For managing free blocks, a so-called free list is used. For allocating free blocks to a process as areas of the main memory, it is necessary to acquire addresses of the blocks allocated to a file. Interface "get_xip_mem( )" provided by a file system supporting XIP is used for allocating free blocks to a file and for acquiring addresses of the free blocks. By calling interface "get_xip_mem( )" in a code such as the code shown in FIG. 12, it is possible to acquire virtual addresses and physical page numbers of blocks corresponding to "offset" in the file as "kmem" and "pfn" respectively. The third parameter designates whether or not blocks are secured. When "1" is appointed as the third parameter as shown in FIG. 12, blocks are secured, and when "0" is appointed as the third parameter, no block is secured.

In the secure in-advance method, at the initialization, "offset" in a code shown in FIG. 12 is sequentially incremented from a value corresponding to the first block of the file to a value corresponding to the last block of the file and each code with different "offset" is executed. As a result, all blocks are secured, and virtual addresses and physical addresses of the blocks are acquired. Then, the free list is generated by use of the addresses of the secured blocks. In the secure on-demand method, blocks to be allocated to a process are selected from among blocks of a file in ascending order of a block number and, only when no free block is listed in the free list when a request is received, new blocks are secured. When areas are released from a process, released blocks are returned to the free list, and the file containing the released blocks is maintained by the file system, both in the cases where the secure in-advance method is adopted and where the secure on-demand method is adopted.

As explained above, the indirect fusion method may be implemented by use of existing interfaces provided by the file system. Accordingly, there is no need to modify an existing file system for implementing the indirect fusion method, and there is no need to develop a program for each type of file system.

Next, an implementation of the mmap method is explained below. In the mmap method, mmap system calls (referred to as "mmap") are used for securing blocks from the file system and for allocating areas to a process. Accordingly, there is no need to modify the kernel of file system to implement the mmap method. When area allocation is performed in the mmap method, mmap system calls are used in a program. In most existing programs, "malloc( )" is used for allocating areas to a process. However, in a standard C library "GNU Libc" normally used in Linux ("Linux" is a registered trademark in Japan), heap areas are allocated to a process when a requested size is comparatively small, and areas secured by "mmap" are allocated to a process when a requested size is comparatively large. In a standard C library "GNU Libc," it is possible to use only "mmap" for allocating areas to a process by setting the threshold value for judging whether a requested size is small or large, as shown in FIG. 13, without modifying the library.

Example 5

Some experimental results of checking performances of information processing device 1 realized by the configurations explained above as example 4 are explained below.

First, results of experiments for comparing costs required for allocating areas to a process are explained below.
(Conditions of Experiments)
A system that uses an NV memory as a main memory is not available. Accordingly, in this experiment, differences in access delays between an NV memory and a DRAM, and a constraint of rewriting times in an NV memory are not taken into account, and a part of a DRAM is deemed to be an NV memory. A personal computer having a processor identified as "Intel Atom D2700 2.13 GHz" is used for the experiment. The hyper-threading function is invalidated by the BIOS, and performance is measured under a single CPU mode. A size of the DRAM of the personal computer is 8 GB, and the lower area of 4 GB of the DRAM is deemed as an NV memory. Parameter "mem=128M" is passed to the kernel for limiting areas of DRAM recognized by the kernel, and performance is measured under a condition that only 128 MB areas of the DRAM are recognized by the kernel. However, in a control experiment referred to as "DRAM method" in this example, the above explained settings for dividing areas of DRAM are not used.
(Results of Experiments)

Figure 14:
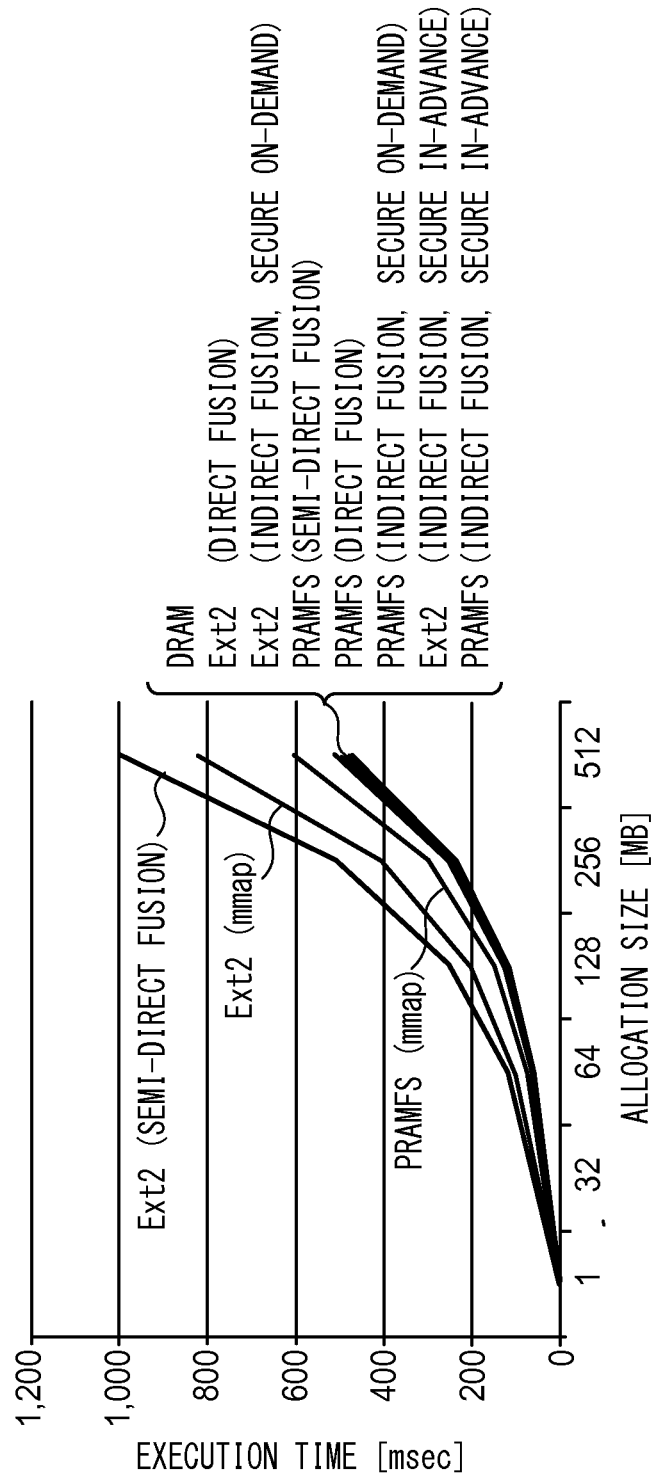
FIG. 14 illustrates graphs showing a result of an experiment for comparing costs for memory allocation of several memory allocation methods.

For measuring a cost for allocating areas to a process, a program was developed. The program secures areas of a number meeting with a size appointed as a parameter, and writes data in the top page of each of the secured areas. A measured cost includes only a cost for allocating areas to a process, and it does not include a cost for releasing the allocated areas from the process. Costs were measured by use of the program in the DRAM method, the direct fusion method, semi-direct fusion method, indirect fusion method with the secured in-advance, indirect fusion method the secure on-demand method and the mmap method. The program was executed with each of two file systems, i.e. Ext2 and PRAMFS, except the program was executed for measuring a cost for allocating areas to a process in the DRAM method. FIG. 14 shows results of the experiments. The horizontal axis indicates allocation sizes (MB), and the vertical axis indicates execution times (msec) each of which is calculated by dividing a value measured by an RDTSC (Read Time Stamp Counter) by the clock frequency.

The results of experiments indicate the following matters:
(1) A cost in the semi-direct fusion method with Ext2 is the highest.
(2) A cost in the mmap method is comparatively high both with Ext2 and PRAMFS.
(3) A cost in the indirect fusion method with the secure in-advance method is the lowest.

When PRAMFS is used, in comparison with the cost of the indirect fusion method with the secure in-advance method, the costs of the direct fusion method, the semi-direct fusion method, the indirect fusion method with the secure on-demand method and the mmap method are 2.3% higher, 2.5% higher, 1.2% higher and 27.9% higher respectively. When Ext2 is used, they are 5.2% higher, 111.5% higher, 3.2% higher and 73.6% higher, respectively. In the indirect fusion method with the secure on-demand method, each time a request for areas of a larger size than a size of available blocks is made, blocks are allocated to a file. However, in the indirect fusion method with the secure on-demand method, once blocks are allocated to a file, the blocks are reused after they are released under the management performed by use of the free list, and therefore, influence on a cost caused by allocations of blocks is limited. In the semi-direct fusion method, influence on a cost caused by allocations of blocks is limited when PRAMFS is used, but the influence is considerable when Ext2 is used. When the semi-direct fusion method is carried out with Ext2, redundant procedures are executed for allocating blocks and releasing the blocks as explained above. It is believed that this is the reason the influence on a cost caused by allocations of blocks is considerable when the semi-direct fusion method is carried out with Ext2. The most remarkable difference between the mmap method and the other methods exists in the procedures for securing blocks from the file system. In the indirect fusion method, only one block is acquired from the free list when a request for areas is made. In the direct fusion method, each time the free list becomes empty, plural blocks are secured from the file system collectively. In the mmap method, each of plural blocks is individually secured from the file system each time a request for areas is made. The results of experiments show that a cost for allocating areas is influenced by a cost for securing blocks from the file system, and a cost is reduced remarkably when blocks are secured collectively.

Next, results of experiments for measuring inconsistencies occurring in the file system are explained below.
(Conditions of Experiments)

Ext2 having a file restoration tool is used as the file system in the experiments. Inconsistencies occurring in the file system when areas are allocated to processes in the direct fusion method, the semi-direct fusion method, the indirect fusion method with the secure in-advance method, the indirect fusion method with the secure on-demand method and the mmap method are measured for comparison. The measurement of inconsistencies in the file system is performed by executing the program for securing areas, killing the program when areas of 512 MB are secured, detecting inconsistencies in the file system by use of the file restoration tool (e2fsck) after restarting the computer, and counting numbers of detected inconsistencies.

The file restoration tool can be executed after the computer is restarted. Accordingly, it is necessary for data stored in areas of the NV memory to be maintained after the computer is restarted. However, when a computer is restarted, the memory is normally initialized. Therefore, a virtual environment realized by adding a function of emulating a main memory in the NV memory to QEMU (http://wiki.qemu.org/Main_Page) is used as an environment for the experiments. When a command shown in FIG. 15 is executed, areas of 128 MB of the DRAM are secured, and all of the blocks of file "nvmemory.img" are mapped to the areas deemed as an NV memory whose physical address starts from "0x10000000," then QEMU is started.

A status of file "nvmemory.img" at a time when the program for allocating areas to a process is killed is maintained even after the virtual environment is restarted. In the virtual environment, a process is killed by a function of QEMU to terminate a process.
(Results of Experiments)

FIG. 16 shows numbers of inconsistencies in the file system detected by the file restoration tool (e2fsck) in the experiments. As shown in FIG. 16, six inconsistencies regarding a number of free blocks were reported when the direct fusion method was used. No inconsistency was reported when the other methods, i.e. the semi-direct fusion method, the indirect fusion method with the secure in-advance method, the indirect fusion method with the secure on-demand method and the mmap method, were used. In the direct fusion method, blocks are secured directly from the file system and the secured blocks are allocated to a process as areas of the main memory. Accordingly, some blocks that are used but not referred by any file may exist, and such blocks cause an inconsistency in a number of free blocks (a free block count) in the file system. It is believed that each of the inconsistencies shown in the results of experiments is a discrepancy between a number of free blocks counted in the file system and a number of free blocks counted with regard to each of the block groups. Namely, the inconsistencies were caused by features of the direct fusion method. A discrepancy between numbers of free blocks is not a serious inconsistency, but it is preferably corrected since some areas become unmanageable and unusable by the file system.

In the semi-direct fusion method, the indirect fusion method with the secure in-advance method, the indirect fusion method with the secure on-demand method and the mmap method, any block secured from the file system to be allocated to a process as an area of the main memory is referred by a file. Accordingly, no inconsistency was reported when these methods were used in the experiments. However, the results do not guarantee that no inconsistency occurs in these methods. For example, if the computer is terminated while a file system is editing data sets for managing files, an inconsistency may occur in the file system. However, such an inconsistency is not caused by features of an adopted method for allocating areas to a process, and it may occur when a usual method is adopted for allocating areas to a process.

Next, results of experiments for measuring how a method for managing free areas influences a cost for allocating areas to a process are explained below.

In accordance with the above-explained results of experiments, it is found that a cost for securing blocks from the file system has a major influence on a cost for allocating areas to a process. Especially in the mmap method, a method for managing free areas used by the file system has a major influence on a cost for allocating areas to a process since each of blocks is secured individually in the mmap method. Accordingly, experiments were carried out using PRAMFS that has a comparatively simple internal structure and modified PRAMFS whose structure for managing free areas in the file system is modified to be more appropriate for handling areas of the memory to decrease a cost for securing blocks.

In the direct fusion method and the indirect fusion method, procedures required for securing a block from the file system include only acquiring an element from the free list. In the mmap method, blocks are secured by use of a function of managing free areas of the file system. In PRAMFS, free areas are managed by use of a bit map, and a procedure of searching bits indicating free areas from the bit map increases a cost for allocating areas to a process. When a HDD with a comparatively long seek time is used, free blocks are not usually managed by use of a free list since the free list promotes fragmentation of data. A method for managing free blocks using a free list is used in many file systems, since once a free block is found, another free block neighboring the found free block is found quickly using the method, and fragmentation of data is not promoted by the bit map. However, when an NV memory with no seek time is used by the file system, there is no merit in using a bit map for managing free areas since searching free areas by use of a bit map is costly, as mentioned above.

Accordingly, if the method of using a free list is adopted instead of the method of using a bit map for managing free areas in the file system using an NV memory, it is assumed that a cost for allocating areas to a process is reduced, especially when the mmap method is used. For the purpose of verifying the assumption, a modified version of PRAMFS that uses a free list for managing free areas instead of a bit map was developed. When the modified PRAMFS is used as the file system, blocks are secured from the file system in the mmap method at substantially the same cost as in the indirect fusion method. Moreover, when the modified PRAMFS is used as the file system, there is no need to maintain a bit map whose data size is comparatively large, and more areas become available for storing data.

Figure 17:
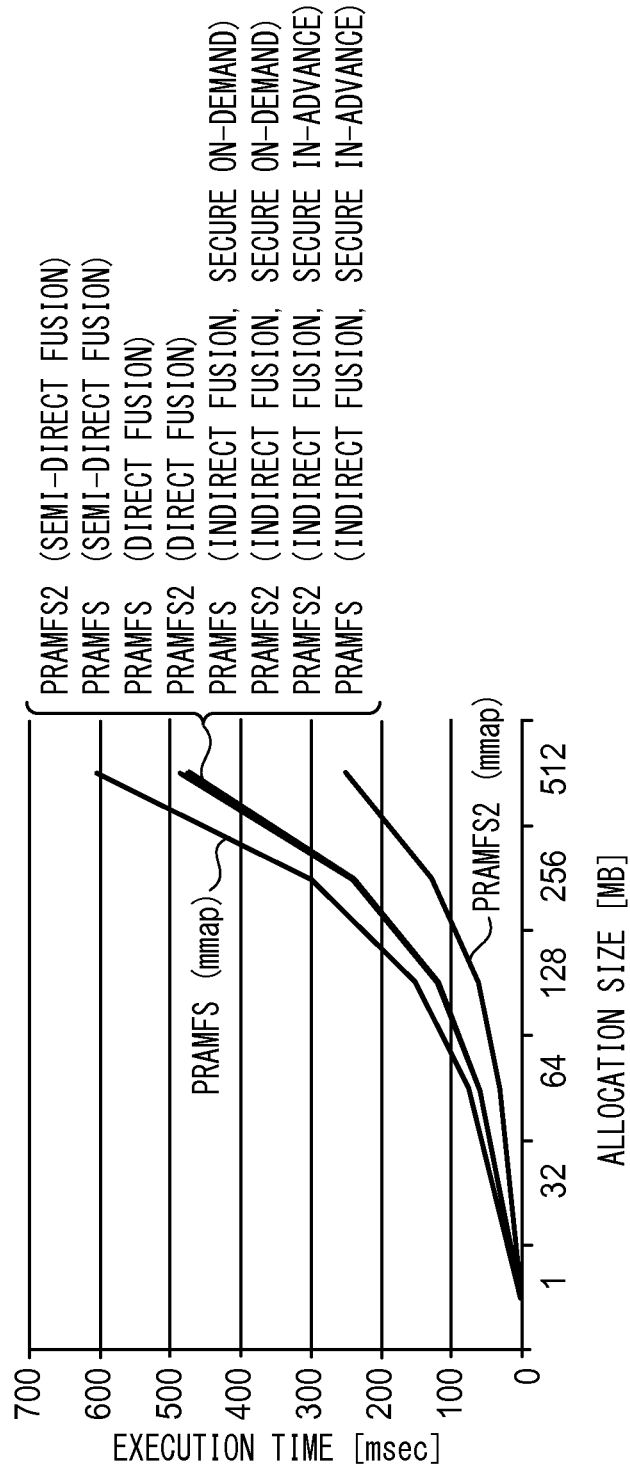
FIG. 17 shows graphs showing a result of experiment for confirming effect of improvement of consistency of a file system on costs of memory allocation in embodiment 1.

FIG. 17 shows results of the experiments for measuring costs for allocating areas to a process in each of the methods for allocating areas to a process. The same program as used in the other experiments, explained above, was used for the experiments. In FIG. 17, the modified PRAMFS using a free list for managing free areas is referred to as "PRAMFS2." Because of cost reduction caused by the change of methods for managing free areas, a cost for allocating areas to a process when the mmap method is used is reduced by 58.2%. On the other hand, the replacement of methods for managing free areas does not have any substantial influence on a cost for allocating areas to a process when methods other than the mmap method are used.

After a cost for allocating areas to a process in the mmap method is remarkably reduced because of the replacement of a bit map with a free list, the cost of the mmap method is 46.8% less than that of the indirect fusion method with the secured in-advance method, and the mmap method becomes the least costly method. For the purpose of verifying the reason that such a remarkable reduction of cost is achieved, a number of instructions and a number of cache misses were measured by use of Performance Monitoring Counter (PMC). A number of instructions was also measured in the environment of QEMU. FIG. 18 shows results of the measurements. In FIG. 18, TSC (Time Stamp Counter) of QEMU indicates a number of instructions, but TSC of Atom indicates an execution time. In FIG. 18, "instruction retired" indicates a number of instructions, "LLC (Last Level Cache) Misses" indicates a total number of L2 cache misses, "MEM LOAD RETIRED. L2 HIT" indicates a number of orders to load data that was missed in L1 cache and hit in L2 cache, and "MEM LOAD RETIRED. L2 MISS" indicates a number of orders to load data that was missed in L2 cache.

The numbers of instructions of QEMU and those of Atom are not identical to each other, since they may be affected by interrupt instructions, but they are similar to each other. A cost measured by a number of instructions is also reduced in the mmap method because of the replacement of a bit map with a free list for managing free areas, but the degree of reduction of the cost is 37.5%, which is less than a cost measured by an execution time. It is believed that reduction of a number of cache misses is one of the reasons an execution time is remarkably reduced because of the replacement of a bit map with a free list. In FIG. 18, both in values of "LLC Misses" and "MEM LOAD RETIRED. L2 MISS," remarkable improvements are recognized. A size of L2 cache of "Atom D2700" is 512 KB per core, and the size is comparatively small even compared to a size of L2 cache of a popular processor for a notebook PC. Accordingly, it is assumed that data is acquired from the cache of Atom when the method for managing free areas uses a free list more frequently than when the method for managing free areas uses a bit map, which causes the high degree of reduction in execution time. The same experiments were carried out by use of "Xeon E3-1270" with L3 cache of 8 MB, and a cost for allocating areas to a process was reduced by 26.0%. The result of the experiments indicates that a cost is affected by a size of cache.

In accordance with the above-explained experiments, it is confirmed that a performance of a file system managing files stored in an NV memory can be improved by tuning its internal structures, since the file system has been tuned for managing files stored in a HDD, and a method of managing free areas is one of the components that should be tuned.

According to information processing device 1 of the present embodiment, when an NV memory is used both as a main memory and a storage, occurrences of inconsistencies in the file system caused by abnormal terminations of the system can be reduced.

In the above-explained embodiment, file management data sets, file area management data sets, memory management data sets and memory area management data sets may be integrated into data sets of a single format. The integrated data sets are referred to as "area management data sets" hereinafter. The area management data sets contain, for example, all physical addresses in a physical address space where NV memory 11 is disposed. Each of the physical addresses is associated with, for example, a file identifier, a logical address, a process identifier, a virtual address, a flag indicating whether an area identified by the physical address is unused or used, etc.

In the above-explained embodiment, a file management data set may contain, for example, a file identifier, an area identifier and a number of areas (referred to as "area number" hereinafter). In this case, the area identifier identifies, for example, the first area of areas where a file identified by the file identifier is written, and the area number indicates, for example, a number of areas where the file is written.

For example, it is assumed that the area identifier is "0x00000011" and the area number is "3." In this case, the file management data set indicates that a file is written in a series of areas identified by area identifiers "0x00000011," "0x00000012" and "0x00000013."

A file management data set may contain plural sets of a file identifier, an area identifier and an area number.

In the above-explained embodiment, memory management unit 14 may have a file identifier acquisition unit that acquires a file identifier from file management data sets. In this case, the file identifier acquisition unit usually acquires a file identifier from among file identifiers contained in file management data sets in accordance with a predetermined rule. In this case, file management information adding unit 143 usually associates area identifiers acquired by unused area specifying unit 142 with a file identifier acquired by the file identifier acquisition unit, and creates a file management data set containing them.

In each of the above-explained examples, the explained procedures and the explained functions may be implemented by a centralized single device or a centralized single system. Alternatively, the explained procedures and the explained functions may be implemented by distributed plural devices or distributed plural systems.

In each of the above-explained examples, each of the explained components of information processing device 1 may be configured by hardware designed for the component. Alternatively, with regard to components that may be realized by software, they may be realized by executing a program. In this case, a program execution unit such as a CPU reads a program from a recording medium such as a hard disk and a semiconductor memory, and executes the program to realize the component.

The program realizing the information processing device according to each of the above-explained examples may be a program as explained below. Namely, the program is a program for causing a computer that is capable of accessing an NV memory as a non-volatile recording medium to function as: a file system unit that manages one or more files stored in the NV memory, and a memory management unit that secures one or more areas of the NV memory that are ready to be used by the file system unit to store a file and allocates the secured one or more areas to a running process in response to a request from the running process.

The functions realized by the above-explained program do not include any function that is realized only by hardware.

The above-explained program may be downloaded from a server to the computer, and executed in the computer. Alternatively, the program may be recorded in a recording medium such as an optical disk such as a CD-ROM, a magnetic disk and a semiconductor memory, read from the recording medium by the computer, and executed by the computer. The program may be used as a component of a program product.

A computer that executes the above-explained program may be either a single device or a group of plural devices. Namely, the processes executed by the computer may be either centralized or distributed.

Figure 19:
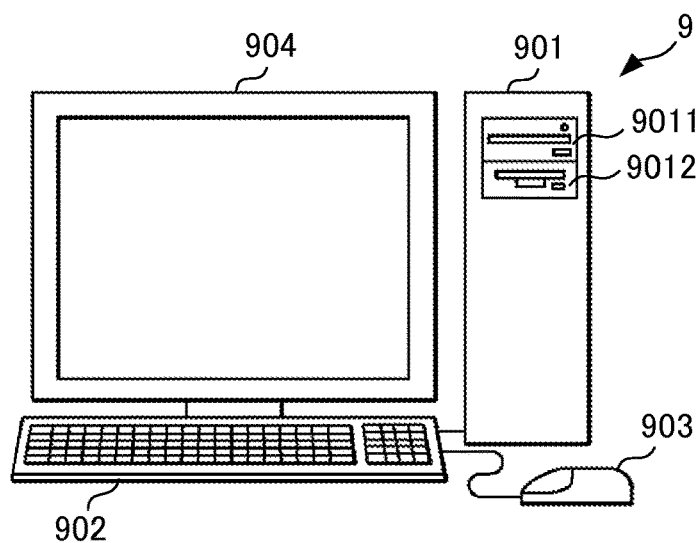
FIG. 19 illustrates an outline of a computer system in embodiment 1.

FIG. 19 shows a configuration of computer system 9 that realizes the above-explained information processing device by executing the above-explained program. Each of the above-explained examples may be realized by a combination of a computer (hardware) and a program (software) that is executed by the computer.

As shown in FIG. 19, computer system 9 comprises computer 901 having CD-ROM drive 9011 and FD drive 9012, keyboard 902, mouse 903 and monitor 904.

Figure 20:
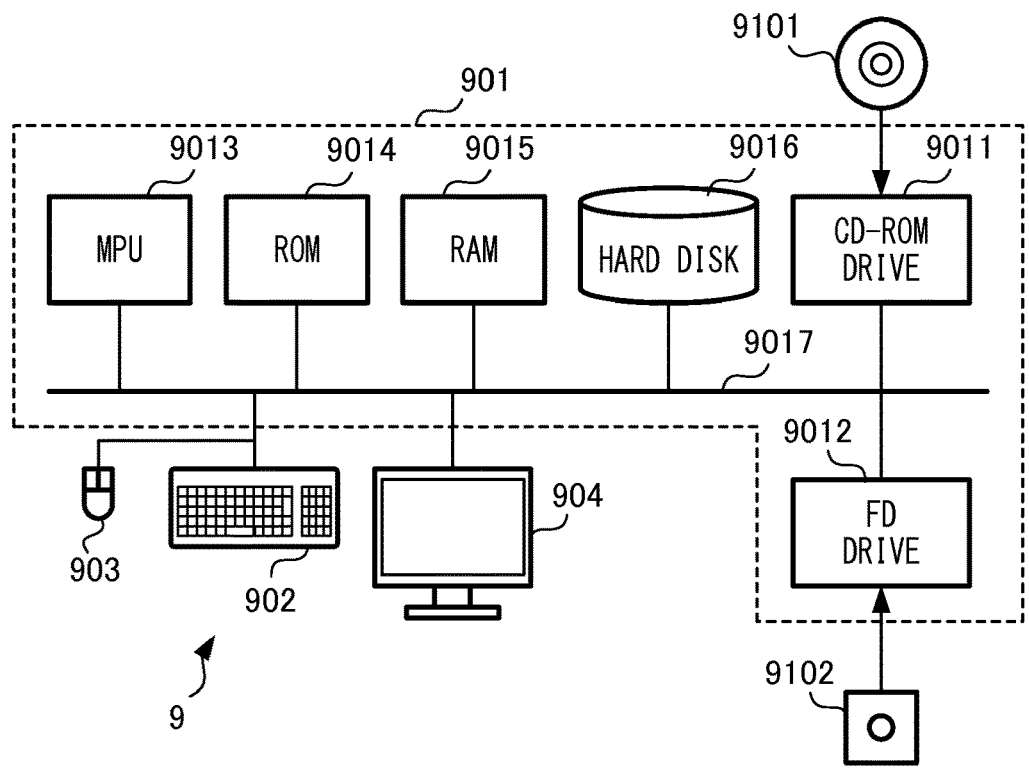
FIG. 20 is a block diagram of a computer system in embodiment 1.

FIG. 20 shows a block diagram of computer system 9. As shown in FIG. 20, computer 901 comprises MPU 9013, ROM 9014, RAM 9015, hard disk 9016 and bus 9017 in addition to CD-ROM drive 9011 and FD drive 9012. ROM 9014 stores programs such as a boot-up program. RAM 9015 is connected with MPU 9013. RAM 9015 temporarily stores instructions made by an application program, as well as providing a temporary memory space for the application program. Hard disk 9016 stores application programs, system programs and various types of data sets. Bus 9017 connects the components of computer 901 such as CD-ROM drive 9011, FD drive 9012 and MPU 9013 with each other. Computer 901 may further have a network interface (not shown in FIG. 20) that provides a connection to a LAN.

The program that causes computer system 9 to function as the information processing device according to the above-explained embodiment may be recorded in CD-ROM 9101 or FD 9102 that may be inserted into CD-ROM drive 9011 or FD drive 9012, respectively, and read from CD-ROM 9101 or FD 9102 to be transferred to hard disk 9016. Alternatively, the program may be transmitted from an external device via a network (not shown in FIG. 20) to computer 901, and stored in hard disk 9016. When the program is executed, it is loaded to RAM 9015. Alternatively, the program may be loaded to RAM 9015 directly from CD-ROM 9101, FD 9102, or an external device via the network.

The program may not include an operating system (OS), a program provided from a third party, or the like that causes the information processing device according to the above-explained embodiment to implement standard functions. Namely, the program may include only instructions to call necessary functions or modules from the OS or the like in a controlled way so that a desired result is achieved. Computer system 9 operates in the same way as a popular computer system, and details of the operation are not explained here.

The present invention should not be limited by the above-explained embodiment, and it may be modified in various ways. These modifications also fall within the scope of the present invention.

As explained above, according to the information processing device of the present invention, when an NV memory is used both as a main memory and a storage, inconsistencies in the file system caused by abnormal terminations of the system may be reduced, and it is useful, for example, as a function of an operating system.

What is claimed is:

1. A non-transitory computer readable medium storing a program for causing a computer that is capable of accessing an NV memory that is a non-volatile recording medium to function as an information processing device comprising:
   a file system unit that manages one or more files stored in the NV memory, a receiving unit that receives a request for allocation of one or more areas from a running process, and
   a memory management unit that secures one or more areas of the NV memory that are ready to be used by the file system unit to store a file, and allocates the secured one or more areas to the running process in response to the request,
   wherein the file system unit manages each of the one or more file that is composed of one or more areas of the NV memory by storing a file identifier of the file in association with one or more area identifiers of the one or more areas,
   the memory management unit selects one or more areas from areas of the NV memory that compose none of the one or more files managed by the file system unit in response to the request, allocates the selected one or more areas to the running process, and manages the one or more areas allocated to the running process by storing area identifiers of the one or more areas in association with a process identifier of the running process,
   the memory management unit stores one or more area identifies of the one or more areas allocated to the running process in association with a file identifier, and
   the file system unit manages the one or more areas allocated to the running process as a file identified by the file identifier.

2. A non-transitory computer readable medium storing a program for causing a computer that is capable of accessing an NV memory that is a non-volatile recording medium to function as an information processing device comprising:
   a file system unit that manages one or more files stored in the NV memory,
   a receiving unit that receives a request for allocation of one or more areas from a running process, and
   a memory management unit that secures one or more areas of the NV memory that are ready to be used by the file system unit to store a file, and allocates the secured one or more areas to the running process in response to the request,
   wherein the memory management unit acquires area identifiers of areas that compose the one or more files managed by the file system unit, and manages the areas as unallocated areas by storing the acquired area identifiers,
   the memory management unit selects one or more areas from the unallocated areas in response to the request, allocates the selected one or more areas to the running process, and manages the one or more areas allocated to the running process by storing area identifiers of the one or more areas in association with a process identifier of the running process, and
   the memory management unit deletes the one or more areas allocated to the running process from the unallocated areas.

3. The non-transitory computer readable medium storing a program according to claim 2, wherein the memory management unit acquires area identifiers of all areas that compose the one or more files managed by the file system unit and stores the acquired area identifiers for identifying unallocated areas before the receiving unit receives the request.

4. The non-transitory computer readable medium storing a program according to claim 2, wherein the memory management unit acquires area identifiers of areas of a number meeting with a size requested by the running process, the areas composing the one or more files managed by the file system, and stores the acquired area identifiers for identifying unallocated areas after the receiving unit receives the request.

5. A non-transitory computer readable medium storing a program for causing a computer that is capable of accessing an NV memory that is a non-volatile recording medium to function as an information processing device comprising:
   a file system unit that manages one or more files stored in the NV memory,
   a receiving unit that receives a request for allocation of one or more areas from a running process, and
   a memory management unit that secures one or more areas of the NV memory that are ready to be used by the file system unit to store a file, and allocates the secured one or more areas to the running process in response to the request,
   wherein the file system unit manages a new file by selecting one or more areas from areas of the NV memory that compose none or the files managed by the file system and storing one or more area identifiers of the selected one or more areas in association with a file identifier of the new file in response to the request, and
   the memory management unit allocates the one or more areas composing the new file to the running process in response to the request, and manages the one or more areas allocated to the running process by storing area identifiers of the one or more areas in association with a process identifier of the running process.

* * * * *